(12) United States Patent
Lee et al.

(10) Patent No.: US 12,112,742 B2
(45) Date of Patent: Oct. 8, 2024

(54) ELECTRONIC DEVICE FOR CORRECTING SPEECH INPUT OF USER AND OPERATING METHOD THEREOF

(71) Applicant: SAMSUNG ELECTRONICS CO., LTD., Suwon-si (KR)

(72) Inventors: Jongsun Lee, Suwon-si (KR); Jongyoub Ryu, Suwon-si (KR); Seonghan Ryu, Suwon-si (KR); Eunji Lee, Suwon-si (KR); Jaechul Yang, Suwon-si (KR); Hyungtak Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 17/536,890

(22) Filed: Nov. 29, 2021

(65) Prior Publication Data

US 2022/0284887 A1    Sep. 8, 2022

Related U.S. Application Data

(63) Continuation of application No. PCT/KR2021/012849, filed on Sep. 17, 2021.

(30) Foreign Application Priority Data

Mar. 3, 2021    (KR) .................. 10-2021-0028352

(51) Int. Cl.
*G10L 15/22*    (2006.01)
*G06F 40/166*    (2020.01)
(Continued)

(52) U.S. Cl.
CPC ........ *G10L 15/1815* (2013.01); *G06F 40/166* (2020.01); *G06F 40/30* (2020.01); *G10L 15/22* (2013.01); *G10L 2015/223* (2013.01)

(58) Field of Classification Search
CPC .......... G10L 15/1815; G10L 2015/223; G06F 40/166; G06F 40/40
(Continued)

(56) References Cited

U.S. PATENT DOCUMENTS 9,589,049 B1 * 3/2017 Carrier ............... G06F 16/3326
10,395,645 B2    8/2019 Kim
(Continued)

FOREIGN PATENT DOCUMENTS

CN    106463114 B * 10/2020 ......... G06F 3/04817
JP    2017-167368 A    9/2017
(Continued)

OTHER PUBLICATIONS

K. A. Yadav and M. Patil, "Confidence calibration measures to improve speech recognition," 2013 International Conference on Communication and Signal Processing, Melmaruvathur, India, 2013, pp. 826-829, doi: 10.1109/iccsp.2013.6577172. keywords: {Speech;Feature extraction;Hidden Markov models;Entropy; (Year: 2013).*

(Continued)

*Primary Examiner* — Bharatkumar S Shah
(74) *Attorney, Agent, or Firm* — Sughrue Mion, PLLC

(57) ABSTRACT

Provided are an electronic device for correcting a speech input, and an operating method thereof. The method may include receiving a first speech signal; obtaining first text; obtaining an intent of the first speech signal and a confidence score of the intent, by inputting the first text to a natural language understanding model; identifying a plurality of correction candidate semantic elements capable of being correction targets in the first text; receiving a second speech signal; obtaining second text; identifying whether the second speech signal is a speech signal for correcting the first text; comparing the plurality of correction candidate semantic (Continued)

elements in the first text with a semantic element in the second text, based on the confidence score; and correcting at least one of the plurality of correction candidate semantic elements in the first text.

16 Claims, 15 Drawing Sheets

(51) Int. Cl.
  *G06F 40/30* (2020.01)
  *G10L 15/18* (2013.01)
(58) Field of Classification Search
  USPC .......................................................... 704/235
  See application file for complete search history.

(56) References Cited

U.S. PATENT DOCUMENTS

| | | | |
|---|---|---|---|
| 10,614,265 B2 | 4/2020 | Fume et al. | |
| 10,672,394 B2 | 6/2020 | LeBeau et al. | |
| 10,679,609 B2 | 6/2020 | Cherepanov et al. | |
| 2016/0322049 A1* | 11/2016 | Bakshi | G06F 16/3329 |
| 2020/0105247 A1 | 4/2020 | Cherepanov et al. | |
| 2020/0279551 A1* | 9/2020 | Sung | G10L 13/08 |
| 2021/0050016 A1 | 2/2021 | Kim et al. | |
| 2021/0082412 A1* | 3/2021 | Kennewick | G10L 13/08 |

FOREIGN PATENT DOCUMENTS

| | | |
|---|---|---|
| KR | 10-1819459 B1 | 1/2018 |
| KR | 10-2018-0054902 A | 5/2018 |
| KR | 10-1971513 B1 | 4/2019 |
| KR | 10-2091684 B1 | 3/2020 |
| KR | 10-2021-0019924 A | 2/2021 |

OTHER PUBLICATIONS

R. Haeb-Umbach et al., "Speech Processing for Digital Home Assistants: Combining Signal Processing With Deep-Learning Techniques," in IEEE Signal Processing Magazine, vol. 36, No. 6, pp. 111-124, Nov. 2019, doi: 10.1109/MSP.2019.2918706. keywords: {Microphones;Speech recognition:Speech processing;Lou (Year: 2019).*

K. A. Yadav and M. Patil, "Confidence calibration measures to improve speech recognition," 2013 International Conference on Communication and Signal Processing, Melmaruvathur, India, 2013, pp. 826-829, doi: 10.1109/iccsp.2013.6577172. keywords: { Speech; Feature extraction; Hidden Markov models;Entrop (Year: 2013).*

Y.-P. Chen, R. Price and S. Bangalore, "Spoken Language Understanding without Speech Recognition," 2018 IEEE International Conference on Acoustics, Speech and Signal Processing (ICASSP), Calgary, AB, Canada, 2018, pp. 6189-6193, doi: 10.1109/ICASSP. 2018.8461718. keywords: {Acoustics;Speech recogniti (Year: 2018).*

International Search Report (PCT/ISA/210) issued Dec. 29, 2021 by the International Searching Authority in International Application No. PCT/KR2021/012849.

Written Opinion (PCT/ISA/237) issued Dec. 29, 2021 by the International Searching Authority in International Application No. PCT/KR2021/012849.

* cited by examiner

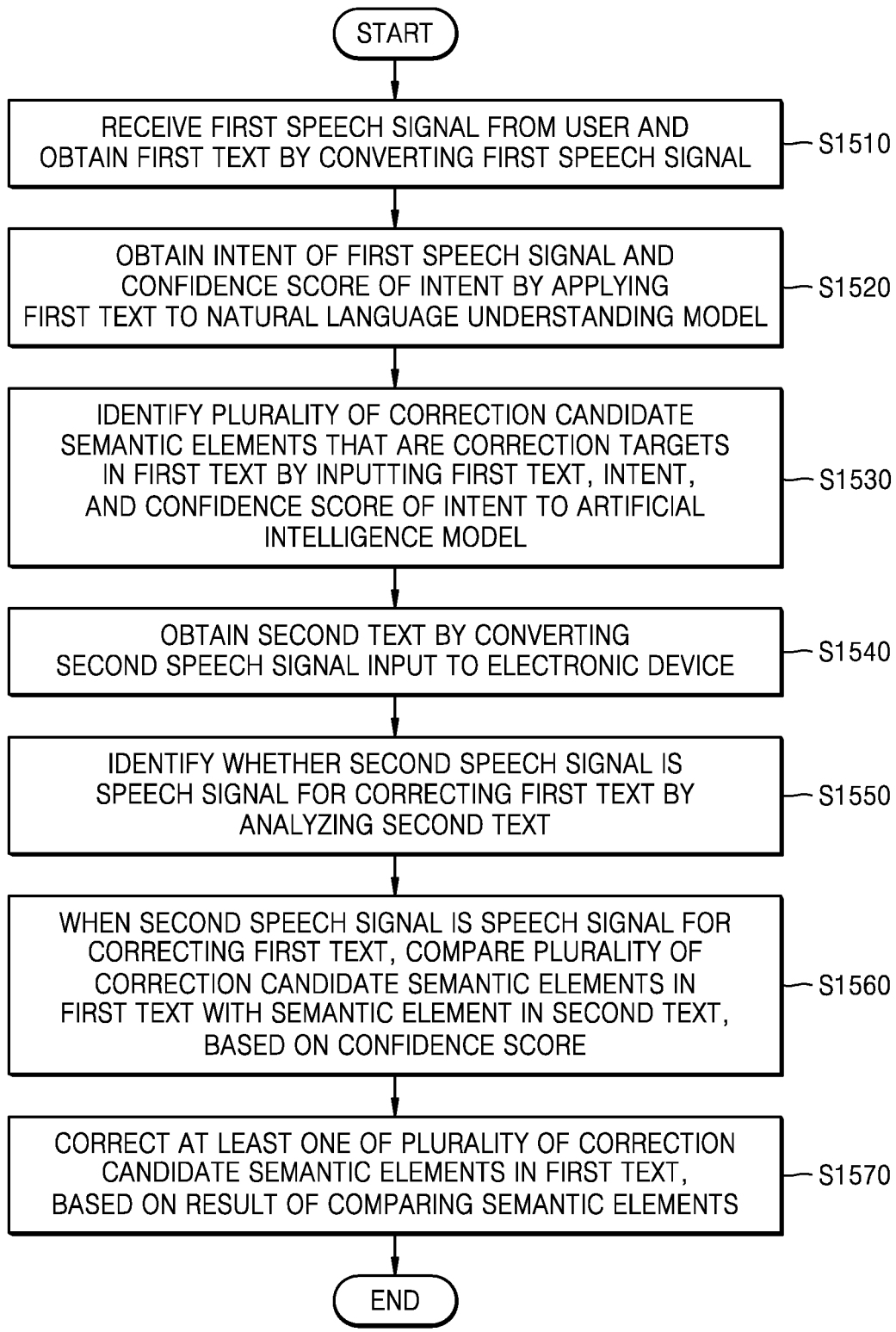

ELECTRONIC DEVICE FOR CORRECTING SPEECH INPUT OF USER AND OPERATING METHOD THEREOF

CROSS-REFERENCE TO RELATED APPLICATION(S)

This application is a by-pass continuation application of International Application No. PCT/KR2021/012849, filed on Sep. 17, 2021, which is based on and claims priority to Korean Patent Application No. 10-2021-0028352, filed on Mar. 3, 2021, in the Korean Intellectual Property Office, the disclosures of which are incorporated by reference herein in their entireties.

BACKGROUND

1. Field

The disclosure relates to a method of correcting a speech input of a user.

2. Description of Related Art

With the development of multimedia technology and network technology, a user is able to receive various services by using a device. In particular, with the development of speech recognition technology, the user is able to input a speech (e.g., an utterance) to the device and receive a natural language response service of receiving a response message according to the speech input.

When the user receives the natural language response service, an initial utterance of the user may be misrecognized by the device and thus a result of recognizing the utterance of the user may need to be partially corrected. Accordingly, there is a need for a technology for responding to the misrecognized initial utterance of the user without the user having to input an entire misrecognized conversation sentence again.

SUMMARY

Provided are an electronic device for providing a natural language response service and an operating method thereof, wherein the electronic device is capable of receiving an initial utterance of a user and identifying a correction intention of the user from a subsequent utterance received to correct the initial utterance after the initial utterance is received.

Provided are an electronic device and an operating method thereof, wherein the electronic device is capable of identifying correction candidates of text converted from an initially uttered speech signal, comparing the text with text converted from a subsequently uttered speech signal, and correcting an initial utterance of a user based on a result of the comparing.

According to an aspect of the disclosure, a method, performed by an electronic device, of correcting a speech input of a user may include receiving a first speech signal from the user; obtaining first text by converting the first speech signal to text; obtaining an intent of the first speech signal and a confidence score of the intent, by inputting the first text to a natural language understanding model; identifying a plurality of correction candidate semantic elements capable of being correction targets in the first text, by inputting the first text, the intent, and the confidence score of the intent to an artificial intelligence model; receiving a second speech signal from the user; obtaining second text by converting the second speech signal to text; identifying whether the second speech signal is a speech signal for correcting the first text, by analyzing the second text; based on the second speech signal being the speech signal for correcting the first text, comparing the plurality of correction candidate semantic elements in the first text with a semantic element in the second text, based on the confidence score; and correcting at least one of the plurality of correction candidate semantic elements in the first text, based on comparing the plurality of correction candidate semantic elements in the first text with the semantic element in the second text.

The method may include outputting a confirmation request for performing a task corresponding to the intent of the first speech signal. The second speech signal may be received from the user after the confirmation request is output.

The identifying of whether the second speech signal is the speech signal for correcting the first text may include identifying another intent of the second speech signal indicating an intention of the user to correct the first text, and the semantic element indicating a word to be corrected by the user, by applying the second text to the natural language understanding model.

The identifying of the plurality of correction candidate semantic elements may include identifying a first correction candidate semantic element and a second correction candidate semantic element from the first text. The first correction candidate semantic element may indicate a word related to the intent of the first speech signal and the second correction candidate semantic element indicates the intent of the first speech signal.

The method may include comparing the confidence score of the intent of the first speech signal with a first threshold value; and determining a correction priority of the plurality of correction candidate semantic elements, based on comparing the confidence score and the first threshold value.

The first threshold value compared with the confidence score may be determined based on another confidence score of a speech signal input to the electronic device before the first speech signal corresponding to the first text is received. Another intent of the speech signal input to the electronic device before the first speech signal is received may be of a same domain as the intent of the first speech signal.

The determining of the correction priority of the plurality of correction candidate semantic elements may include: based on the confidence score of the intent of the first speech signal being equal to or greater than the first threshold value, determining the first correction candidate semantic element to have a higher correction priority than the second correction candidate semantic element; and based on the confidence score of the intent of the first speech signal being less than the first threshold value, determining the second correction candidate semantic element to have the higher correction priority than the first correction candidate semantic element.

The comparing of the plurality of correction candidate semantic elements in the first text with the semantic element in the second text may include calculating difference values indicating differences between the plurality of correction candidate semantic elements in the first text and the semantic element for correction by the user in the second text, based on the correction priority.

The correcting of the at least one of the plurality of correction candidate semantic elements in the first text may include correcting another semantic element in the first text, based on comparing the difference values with a second threshold value.

The calculating of the difference values may include calculating the difference values by applying an edit distance algorithm, based on at least one of a difference between characters, a difference between words, or a difference between pronunciation expressions.

According to an aspect of the disclosure, an electronic device for correcting a speech input of a user may include an input interface configured to receive a speech signal; a storage configured to store a program including one or more instructions; and a processor configured to execute the one or more instructions of the program stored in the storage to: receive a first speech signal from a user via the input interface; obtain first text by converting the first speech signal to text; obtain an intent of the first speech signal and a confidence score of the intent, by inputting the first text to a natural language understanding model; identify a plurality of correction candidate semantic elements capable of being correction targets in the first text, by inputting the first text, the intent, and the confidence score of the intent to an artificial intelligence model; receive a second speech signal from the user via the input interface; obtain second text by converting the second speech signal to text; identify whether the second speech signal is a speech signal for correcting the first text, by analyzing the second text; based on the second speech signal being the speech signal for correcting the first text, compare the plurality of correction candidate semantic elements in the first text with a semantic element in the second text, based on the confidence score; and correct at least one of the plurality of correction candidate semantic elements in the first text, based on comparing the plurality of correction candidate semantic elements in the first text with the semantic element in the second text.

The electronic device may further include an output interface. The processor may execute the one or more instructions to output a confirmation request for performing a task corresponding to the intent of the first speech signal, via the output interface. The second speech signal is received from the user after the confirmation request is output.

The processor may execute the one or more instructions to identify another intent of the second speech signal indicating an intention of the user to correct the first text, and the semantic element indicating a word to be corrected by the user, by applying the second text to the natural language understanding model.

The processor may execute the one or more instructions to identify a first correction candidate semantic element and a second correction candidate semantic element from the first text. The first correction candidate semantic element may indicate a word related to the intent of the first speech signal and the second correction candidate semantic element indicates the intent of the first speech signal.

The processor may execute the one or more instructions to: compare the confidence score of the intent of the first speech signal with a first threshold value; and determine a correction priority of the plurality of correction candidate semantic elements, based on comparing the confidence score and the first threshold value.

The first threshold value compared with the confidence score may be determined based on another confidence score of a speech signal input to the electronic device before the first speech signal corresponding to the first text is received. Another intent of the speech signal input to the electronic device before the first speech signal is received may be of a same domain as the intent of the first speech signal.

The processor may, based on the confidence score of the intent of the first speech signal being equal to or greater than the first threshold value, determine the first correction candidate semantic element to have a higher correction priority than the second correction candidate semantic element; and based on the confidence score of the intent of the first speech signal being less than the first threshold value, determine the second correction candidate semantic element to have the higher correction priority than the first correction candidate semantic element.

The processor may calculate difference values indicating differences between the plurality of correction candidate semantic elements in the first text and the semantic element for correction by the user in the second text, based on the correction priority.

The processor may correct another semantic element in the first text, based on comparing the difference values with a second threshold value.

According to an aspect of the disclosure, a non-transitory computer-readable recording medium may have recorded thereon a program for executing, by an electronic device, a method of comprising: receiving a first speech signal from the user; obtaining first text by converting the first speech signal to text; obtaining an intent of the first speech signal and a confidence score of the intent, by inputting the first text to a natural language understanding model; identifying a plurality of correction candidate semantic elements capable of being correction targets in the first text, by inputting the first text, the intent, and the confidence score of the intent to an artificial intelligence model; receiving a second speech signal from the user; obtaining second text by converting the second speech signal to text; identifying whether the second speech signal is a speech signal for correcting the first text, by analyzing the second text; based on the second speech signal being the speech signal for correcting the first text, comparing the plurality of correction candidate semantic elements in the first text with a semantic element in the second text, based on the confidence score; and correcting at least one of the plurality of correction candidate semantic elements in the first text, based on comparing the plurality of correction candidate semantic elements in the first text with the semantic element in the second text.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 is a flowchart of a method, performed by an electronic device, of correcting a misrecognized input speech signal, based on a user input, according to an embodiment of the disclosure.

DETAILED DESCRIPTION

Figure 1:
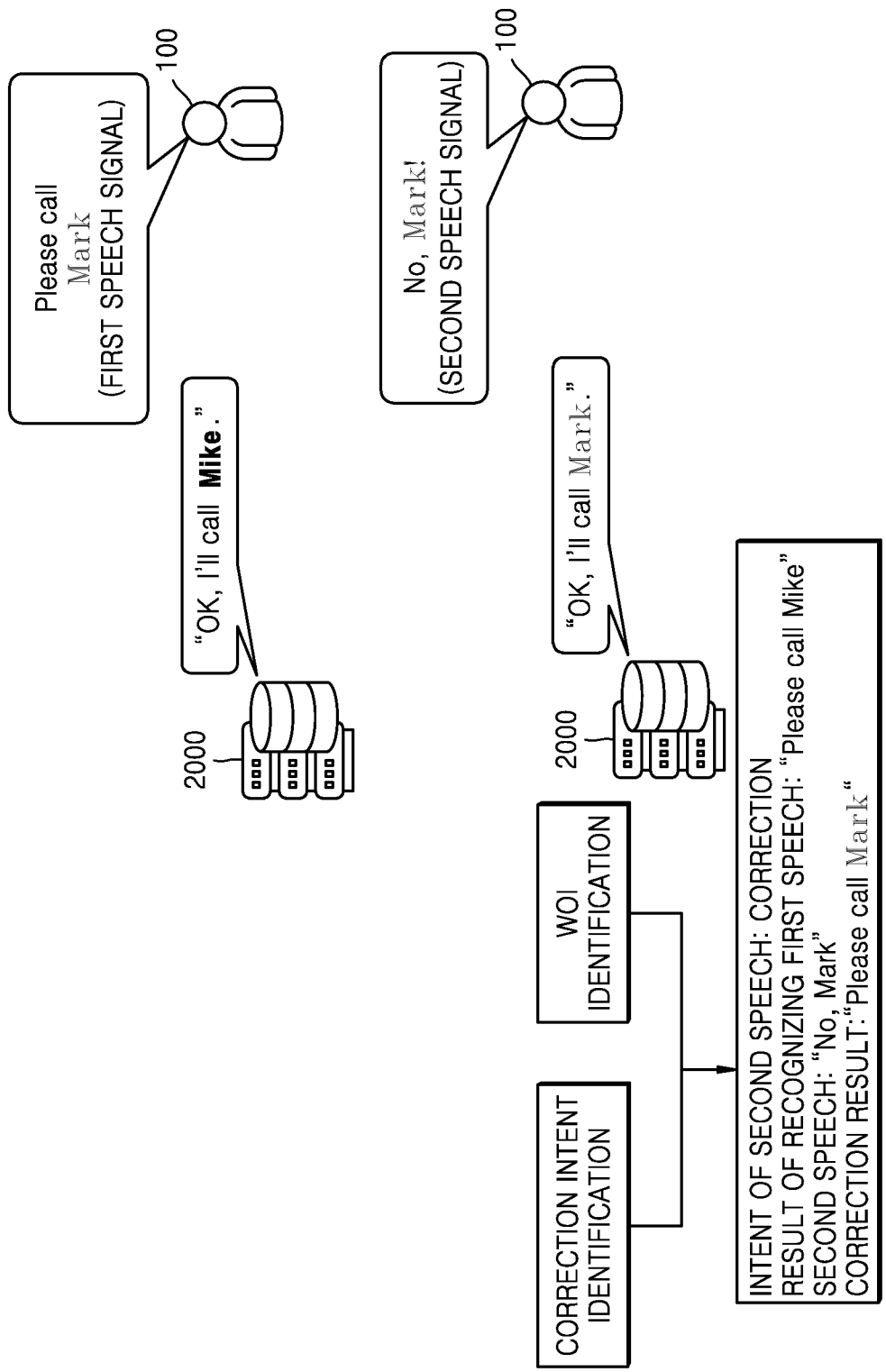
FIG. 1 is a diagram for describing a method, performed by an electronic device, of correcting a speech signal input based on a user input, according to an embodiment of the disclosure.

In the disclosure, the expression "at least one of a, b, or c" may refer to only "a", only "b", only "c", both of "a" and "b", both of "a" and "c", both of "b" and "c", all of "a", "b", and "c".

The terms used in the specification will be briefly defined, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular may encompass the expression in the plural, unless it has a clearly different meaning in the context. Terms used herein, including technical or scientific terms, may have the same meaning as commonly understood by one of ordinary skill in the art described in the disclosure. Further, the terms including ordinal numbers such as "first", "second", and the like used in the present specification may be used to describe various components, but the components should not be limited by the terms. The above terms are used only to distinguish one component from another.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Hereinafter, embodiments of the disclosure will be described in detail with reference to the accompanying drawings such that one of ordinary skill in the art may easily implement the embodiments of the disclosure. However, the disclosure may be implemented in various different forms and is not limited to embodiments of the disclosure described herein. Also, in the drawings, parts irrelevant to the description are omitted in order to clearly describe the disclosure, and like reference numerals designate like elements throughout the specification.

FIG. 1 is a diagram for describing a method, performed by an electronic device 2000, of correcting a speech signal input based on a user input, according to an embodiment of the disclosure.

Referring to FIG. 1, the electronic device 2000 according to an embodiment of the disclosure may be an electronic device for providing a natural language response service.

According to an embodiment of the disclosure, the electronic device 2000 may receive, from a user 100, a speech signal indicating a command regarding a task to be performed by the user 100. The electronic device 2000 may convert the speech signal into text by performing automatic speech recognition (ASR) on the speech signal received from the user 100. The electronic device 2000 may apply the text obtained from the speech signal to a natural language understanding (NLU) model, thereby identifying an intent indicating an utterance intention of the received speech signal and entities indicating components of a sentence.

According to an embodiment of the disclosure, the electronic device 2000 may output, to the user 100, a confirmation request for performing a task corresponding to the identified intent. In this case, to output a response corresponding to the utterance intention of the user 100, the electronic device 2000 may generate and edit utterance data related to the task corresponding to the intent, by using a natural language generation (NLG) model, thereby generating a natural language for a conversation with the user 100.

According to an embodiment of the disclosure, a result of recognizing a first speech signal by the electronic device 2000 may be different than a conversation sentence uttered by the user 100, because noise or the like is added to the first speech signal of the user 100 or a result of performing the ASR is inaccurate.

In this case, the electronic device 2000 may receive a second speech signal additionally uttered by the user 100 to correct the result of recognizing the first speech signal that has been misrecognized, and correct the result of recognizing the first speech signal that has been misrecognized, based on the received second speech signal.

According to an embodiment of the disclosure, the electronic device 2000 may identify whether the received second speech signal is a speech signal for correcting the result of recognizing the first speech signal. The electronic device 2000 may identify a word indicating a correction intention of the user 100 and a word to be corrected by the user 100, from text converted from the second speech signal.

According to an embodiment of the disclosure, when the received second speech signal is identified as the speech signal for correcting the result of recognizing the first speech signal, the electronic device 2000 may identify correction candidate words to be corrected from the conversation sentence of the first speech signal by using a word of interest (WOI) identification model.

In this case, the WOI identification model may label and output correction candidate semantic elements to determine a comparison order of words that may be correction targets in the conversation sentence of the first speech signal. The correction candidate semantic elements may be semantic elements indicating the words that may be the correction target in first text obtained by transcribing the first speech signal. The WOI identification model may be an artificial intelligence model generated via training.

The electronic device 2000 may correct the first speech signal by comparing only the correction candidate words output from the WOI identification model with a word to be corrected by the user 100.

For example, when the conversation sentence of the first speech signal is "Please call Mark", the result of recognizing the first speech signal is "Please call Mike.", and a conversation sentence of the second speech signal is "No, Mark!", the electronic device 2000 may identify a correction candidate word "Mike" in the result of recognizing the first speech signal by using the WOI identification model, and compare the correction candidate word with a word "Mark" to be corrected by the user 100, thereby obtaining a conversation sentence "Please call Mark", that is a result of correcting the result of recognizing the first speech signal.

In response to the conversation sentence "Please call Mark." that is the corrected result, the electronic device 2000 may output a conversation sentence "OK, I'll call Mark." generated by using the NLG model, thereby providing, to the user 100, a result of correcting the utterance of the user 100.

Figure 2:
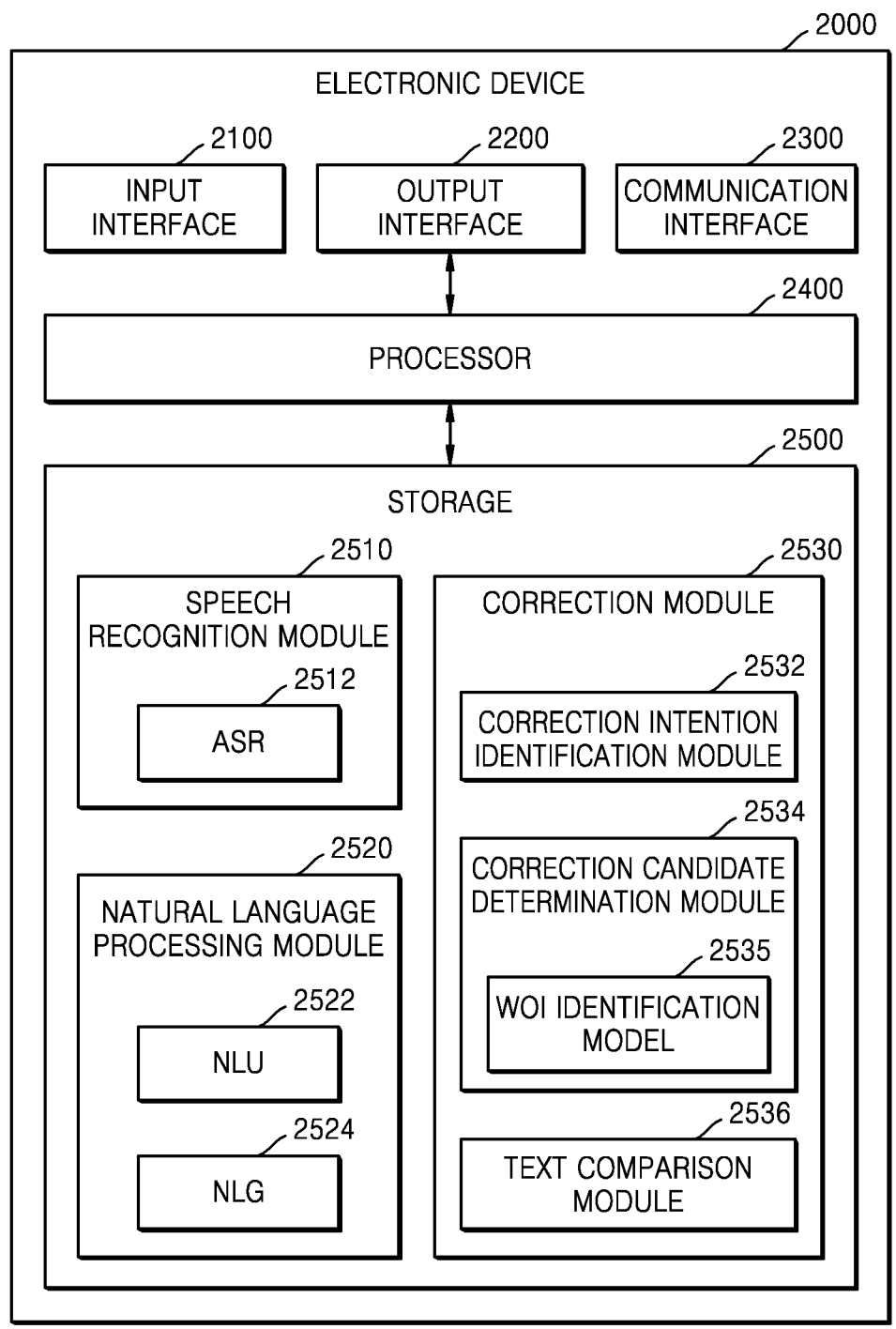
FIG. 2 is a block diagram of a configuration of an electronic device, according to an embodiment of the disclosure.

FIG. 2 is a block diagram of a configuration of the electronic device 2000, according to an embodiment of the disclosure.

Referring to FIG. 2, the electronic device 2000 according to an embodiment of the disclosure may include an input interface 2100, an output interface 2200, a communication interface 2300, a processor 2400, and a storage 2500.

The electronic device 2000 according to an embodiment of the disclosure may be an electronic device for providing a natural language response service. The electronic device 2000 may include, for example, a smartphone, a tablet personal computer (PC), a PC, a laptop computer, a smart television (TV), a smart refrigerator, or an artificial intelligence speaker, on which a natural language response service may be mounted. However, the electronic device 2000 is not limited thereto, and the electronic device 2000 according to an embodiment of the disclosure may be a server for providing a natural language response service.

The input interface 2100 according to an embodiment of the disclosure may be a unit into which data for a user to control the electronic device 2000 is input. For example, the input interface 2100 may include microphone, a key pad, a dome switch, a touch pad (e.g., contact capacitance type, pressure resistive type, an infrared (IR) detection type, surface ultrasonic wave conduction type, integral tension measuring type, piezo-effect type, or the like), a jog wheel, a jog switch, or the like, but is not limited thereto. The input interface 2100 may receive a speech command of the user of the electronic device 2000.

The output interface 2200 according to an embodiment of the disclosure may output an audio signal, a video signal, or a vibration signal, and may include at least one of a display, a sound output interface, or a vibration motor.

The communication interface 2300 may perform data communication with other peripheral devices required to provide a natural language response service or a server for providing a natural language response service, under control of the processor 2400.

The communication interface 2300 may perform the data communication with the other peripheral devices required to provide a natural language response service or the server for providing a natural language response service, by using at least one of data communication methods including, for example, wired local area network (LAN), wireless LAN, Wi-Fi, Bluetooth, ZigBee, Wi-Fi direct (WFD), infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliance (WiGig), and radio frequency (RF) communication.

The communication interface 2300 according to an embodiment of the disclosure may receive, from the other peripheral devices or the server, a first speech signal and a second speech signal of the user.

The processor 2400 may execute one or more instructions of a program stored in the storage 2500. The processor 2400 may include a hardware component performing arithmetic operations, logic operations, input/output operations, and signal processing.

The processor 2400 may be configured of at least one of, for example, a central processing unit (CPU), a microprocessor, a graphics processing unit (GPU), an application specific integrated circuit (ASIC), a digital signal processor (DSP), a digital signal processing device (DSPD), a programmable logic device (PLD), a field programmable gate array (FPGA), an application processor (AP), a neural processing unit, or an artificial intelligence-dedicated processor designed in a hardware structure specialized for processing of an artificial intelligence model, but is not limited thereto.

The processor 2400 according to an embodiment of the disclosure may convert the received first and second speech signals of the user into text by performing ASR. Also, the processor 2400 may analyze the text by using an NLU model 2522 and provide a natural language response service to the user based on a result of the analysis.

The storage 2500 may include, for example, a non-volatile memory including at least one of a flash memory, a hard disk, a multimedia card micro type memory, a card type memory (for example, a secure digital (SD) or extreme digital (XD) memory), read-only memory (ROM), electrically erasable read-only memory (EEPROM), programmable read-only memory (PROM), a magnetic memory, a magnetic disk, or an optical disk, and a volatile memory, such as random-access memory (RAM) or static random-access memory (SRAM).

The storage 2500 may store instructions, data structures, and program codes, which may be read by the processor 2400. According to embodiments of the disclosure, operations performed by the processor 2400 may be implemented by executing program instructions or codes stored in the storage 2500. The storage 2500 may store data and program instruction codes corresponding to a speech recognition module 2510, a natural language processing module 2520, and a correction module 2530.

According to an embodiment of the disclosure, the processor 2400 may perform ASR on a speech signal received from the user and convert the received speech signal into text, by using an ASR model 2512 included in the speech recognition module 2510. The ASR model 2512 may include an acoustic model (AM) or a language model (LM), but is not limited thereto.

According to an embodiment of the disclosure, the processor 2400 may identify an intention of a conversation sentence uttered by the user and generate a response sentence corresponding to the intention of the user, by using the NLU model 2522 and an NLG model 2524 included in the natural language processing module 2520.

The processor 2400 may analyze text obtained via the ASR model 2512 by using the NLU model 2522, thereby identifying an intent indicating an intention of the text and entities indicating components of the conversation sentence.

The processor 2400 may generate natural language indicating a message for a confirmation request regarding whether to perform an operation of the electronic device 2000 according to a speech signal of the user, by using the NLG model 2524.

According to an embodiment of the disclosure, the processor 2400 may correct a misrecognized speech recognition result, based on a user response, by using the correction module 2530.

The correction module 2530 according to an embodiment of the disclosure may include a correction intention identification module 2532, a correction candidate determination module 2534, and a text comparison module 2536.

The processor 2400 may identify, by using the correction intention identification module 2532, whether the second speech signal input after the first speech signal of the user is input is a speech signal for correcting a result of recognizing the first speech signal. The result of recognizing the first speech signal may be first text obtained by performing ASR on the first speech signal.

The correction intention identification module 2532 may identify whether the second speech signal is a speech signal for correcting the result of recognizing the first speech signal by analyzing second text obtained from the second speech signal.

According to an embodiment of the disclosure, the correction intention identification module 2532 may analyze the second text by using a rule-based analysis method. The correction intention identification module 2532 may extract, from the second text, a word indicating an intention of correcting the result of recognizing the first speech signal. The correction intention identification module 2532 may identify whether the second speech signal is the speech signal for correcting the result of recognizing the first speech signal, based on whether the second text includes the word indicating a correction intention.

According to an embodiment of the disclosure, the correction intention identification module 2532 may analyze the second text by using the NLU model 2522. The correction intention identification module 2532 may parse the second text and identify an intent indicating an intention of the second text and entities indicating components of a sentence of the second text.

The correction intention identification module 2532 may identify whether the second speech signal is the speech signal for correcting the result of recognizing the first speech signal, based on whether the identified intent of the second speech signal is an intent included in a "correction" domain. Here, a domain may indicate a category of intent in an NLU model pre-set to classify an intent when the NLU model identifies the intent by analyzing text.

The processor 2400 may identify, by using the correction candidate determination module 2534, correction candidate semantic elements that may be correction targets, from among semantic elements in the first text converted from the first speech signal. Here, a semantic element may be a component of a unit having semantics, from among components configuring a sentence.

According to an embodiment of the disclosure, a WOI identification model 2535 may be an artificial intelligence model generated via training. The WOI identification model 2535 may output semantic elements by receiving the identified intent and entities from the NLU model 2522.

When the second speech signal is the speech signal for correcting the result of recognizing the first speech signal, the correction candidate determination module 2534 may identify the correction candidate semantic elements that may be the correction targets in the first text, by using the WOI identification model 2535.

According to an embodiment of the disclosure, the correction candidate determination module 2534 may determine a correction priority of the correction candidate semantic elements. According to an embodiment of the disclosure, when the correction candidate semantic elements are compared with a semantic element in the second text by the text comparison module 2536, the correction candidate semantic elements may be sequentially compared based on the correction priority.

The processor 2400 may compare the correction candidate semantic elements in the first text with the semantic element in the second text for correction by the user, by using the text comparison module 2536.

According to an embodiment of the disclosure, the text comparison module 2536 may compare the correction candidate semantic elements in the first text with the semantic element in the second text for correction by the user.

When there is a plurality of correction candidate semantic elements in the first text, the text comparison module 2536 may compare the plurality of correction candidate semantic elements with the semantic element in the second text, based on the correction priority. The text comparison module 2536 may calculate a difference value indicating a difference between the correction candidate semantic element in the first text and the semantic element in the second text, and correct at least one semantic element in the first text, based on the calculated difference value.

When the calculated difference value is smaller than a certain threshold value and thus it is identified that the correction candidate semantic element in the first text is similar to the semantic element in the second text for correction by the user, the text comparison module 2536 may determine the correction candidate semantic element identified to be similar to the semantic element in the second text as a correction target semantic element.

The text comparison module 2536 may replace the correction target semantic element with the semantic element in the second text, thereby correcting the first text.

Detailed operations of the electronic device 2000 according to an embodiment of the disclosure correcting the first speech signal will be described in detail with reference to FIGS. 3 through 15.

Figure 3:
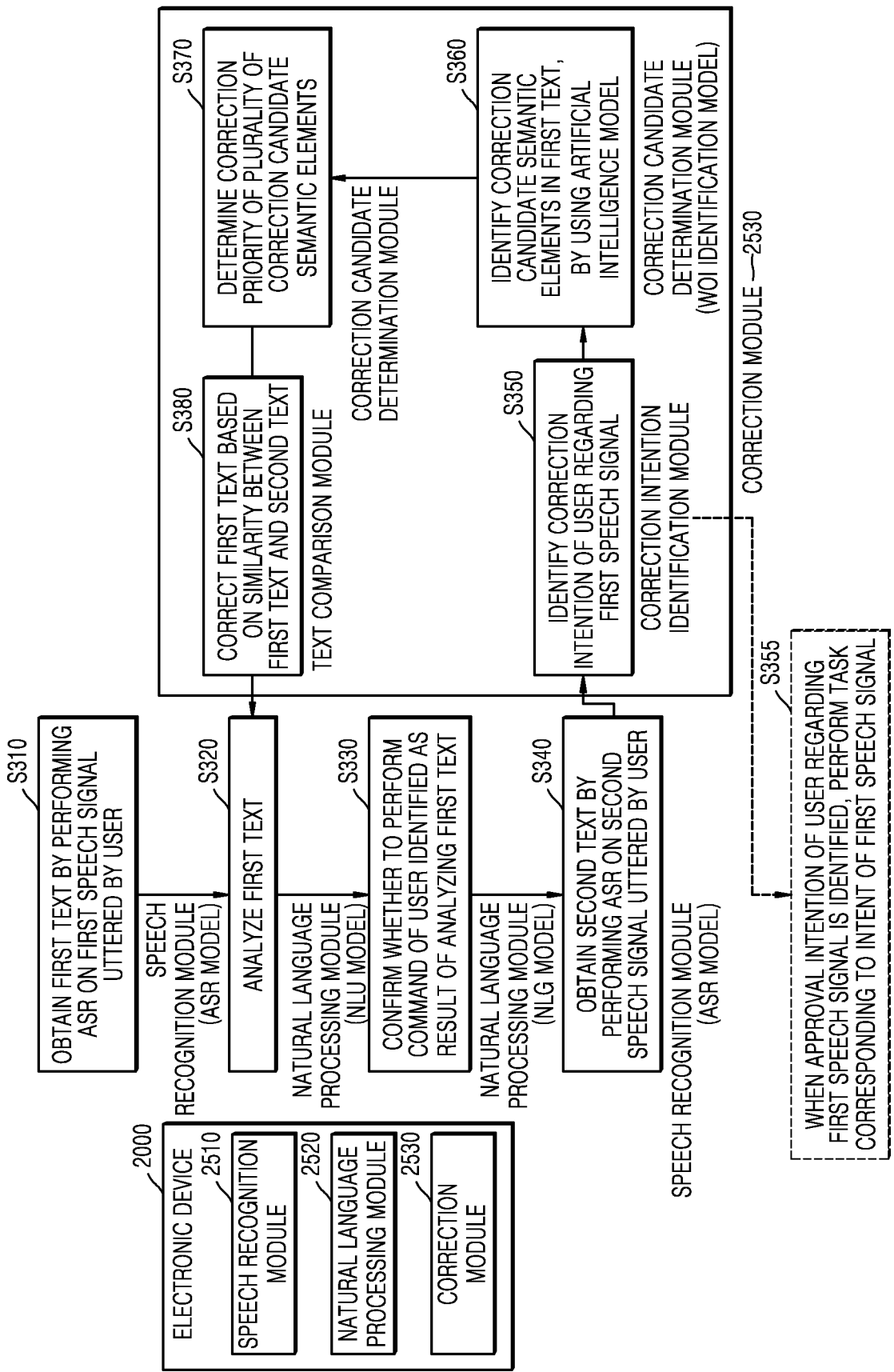
FIG. 3 is a flow diagram for describing operations of a plurality of modules included in an electronic device, according to an embodiment of the disclosure.

FIG. 3 is a flow diagram for describing operations of a plurality of modules included in the electronic device 2000, according to an embodiment of the disclosure.

Referring to FIG. 3, the electronic device 2000 according to an embodiment of the disclosure may include at least the speech recognition module 2510, the natural language processing module 2520, and the correction module 2530.

In operation S310, the electronic device 2000 according to an embodiment of the disclosure may perform ASR on a first speech signal uttered by a user, by using the speech recognition module 2510. The electronic device 2000 may obtain first text by transcribing the first speech signal of the user into text, by performing the ASR.

In operation S320, the electronic device 2000 according to an embodiment of the disclosure may analyze the first text by using the natural language processing module 2520. In this case, text input to the natural language processing module 2520 may be the first text obtained from the first speech signal and output in operation S310. Alternatively, the text input to the natural language processing module 2520 may be text obtained by correcting the first text and output in operation S380. Hereinafter, for convenience of description, the first text output in operation S310 will be described as an example.

According to an embodiment of the disclosure, the electronic device 2000 may parse the first text and identify an intent indicating an utterance intention of the first speech signal and entities indicating components of a conversation sentence of the first speech signal, by using the NLU model 2522. Also, the electronic device 2000 may obtain a confidence score of the identified intent. Here, the confidence score of the intent may denote a score of how accurately the NLU model 2522 has predicted intent indicating an intention of the user from text converted from a speech signal of the user.

In operation S330, the electronic device 2000 according to an embodiment of the disclosure may output a confirmation request message for confirmation from the user about whether to perform an operation according to the first speech signal of the user, based on a result of analyzing the first text.

The electronic device 2000 may generate and edit utterance data related to the intent and entities of the first speech signal to generate and output the confirmation request message, by using an NLG model.

According to an embodiment of the disclosure, the confirmation request message may be output via the output interface 2200 of the electronic device 2000. The electronic device 2000 may output the confirmation request message on a display in a form of a video signal, or via a speaker in a form of an audio signal.

In operation S340, the electronic device 2000 according to an embodiment of the disclosure may perform ASR on a second speech signal uttered by the user. The electronic device 2000 may obtain second text by transcribing the second speech signal of the user into text. Here, the second speech signal may be a speech signal input to the electronic device 2000 after the confirmation request message is output from the electronic device 2000.

According to an embodiment of the disclosure, the second speech signal may include a speech signal of the user for correcting a result of recognizing the first speech signal or a speech signal of the user for confirming that the result of recognizing the first speech signal is suitable.

Based on determining that the confirmation request message output from the electronic device 2000 is different from an intention of the user, the user of the electronic device 2000 may input, to the electronic device 2000, the second speech signal for correcting the result of recognizing the first speech signal.

Based on determining that the confirmation request message output from the electronic device 2000 matches the intention of the user, the user of the electronic device 2000 may input, to the electronic device 2000, the second speech signal for confirming that the result of recognizing the first speech signal is suitable.

In operation S350, the electronic device 2000 according to an embodiment of the disclosure may identify an intention of the second speech signal uttered by the user after the first speech signal is input, by using the correction intention identification module 2532 included in the correction module 2530. The electronic device 2000 may identify whether the second speech signal is a speech signal for correcting the first text, i.e., the result of speech-recognizing the first speech signal.

According to an embodiment of the disclosure, the electronic device 2000 may analyze the second text by using a rule-based analysis method. The electronic device 2000 may identify whether a word (e.g., "No") with an intention of correcting the first text is included in the second text. When the second text includes the word for correcting the first text, the electronic device 2000 may identify the second speech signal as a speech signal for correcting the first text.

According to an embodiment of the disclosure, when the second speech signal is identified as the speech signal for correcting the first text, the electronic device 2000 may identify a semantic element in the second text for correction by the user.

According to an embodiment of the disclosure, the electronic device 2000 may analyze the second text by using the NLU model 2522. The electronic device 2000 may parse the second text and identify an intent indicating an utterance intention of the second speech signal and entities indicating components of a sentence of the second speech signal. The electronic device 2000 may identify whether the second speech signal is the speech signal for correcting the first text, based on a domain of the identified intent of the second speech signal. Here, the domain of the intent may indicate a category of intent pre-set to classify the intent. When the domain of the intent of the second speech signal output from the NLU model 2522 corresponds to a "correction" domain, the electronic device 2000 may identify that the second speech signal is the speech signal for correcting the first text.

According to an embodiment of the disclosure, when the second speech signal is identified as the speech signal for correcting the first text, the electronic device 2000 may identify the semantic element in the second text for correction by the user.

According to an embodiment of the disclosure, when the second speech signal is identified as not being the speech signal for correcting the first text (e.g., when it is identified that the result of recognizing the first speech signal is suitable), the electronic device 2000 may perform operation S355.

According to an embodiment of the disclosure, when the second speech signal is identified as the speech signal for correcting the first text, the electronic device 2000 may perform operation S360.

In operation S355, when an approval intention of the user regarding the first speech signal is identified, the electronic device 2000 according to an embodiment of the disclosure may perform a task corresponding to the intent of the first speech signal.

In operation S360, the electronic device 2000 according to an embodiment of the disclosure may identify correction candidate semantic elements in the first text, by using the correction candidate determination module 2534 included in the correction module 2530.

When a correction intention of the user regarding the first speech signal is identified from the second speech signal, the electronic device 2000 may identify a plurality of correction candidate semantic elements in the first text by using the WOI identification model 2535. Here, the WOI identification model 2535 may be an artificial intelligence model obtained via training. The plurality of correction candidate semantic elements output from the WOI identification model 2535 may each be labeled. Based on labels of the correction candidate semantic elements, the electronic device 2000 may determine an order of comparing the correction candidate semantic elements that may be correction targets in the first text with a semantic element in the second text. The plurality of correction candidate semantic elements output from the WOI identification model 2535 will be described additionally with reference to FIG. 7.

In operation S370, the electronic device 2000 according to an embodiment of the disclosure may determine a correction priority of the plurality of correction candidate semantic elements identified in operation S350, by using the correction candidate determination module 2534 included in the correction module 2530. The electronic device 2000 may determine the correction priority of the plurality of correction candidate semantic elements, based on the plurality of correction candidate semantic elements labeled and output from the WOI identification model 2535, and a confidence score of the intent of the first text. For example, when the confidence score of the intent of the first speech signal is equal to or greater than a certain threshold value, the electronic device 2000 may compare first semantic elements labeled with a same label with the semantic element in the second text. When the confidence score of the intent of the first speech signal is smaller than the certain threshold value, the electronic device 2000 may compare a second semantic element labeled with a label different from the first semantic element, with the semantic element in the second text.

In operation S380, the electronic device 2000 according to an embodiment of the disclosure may calculate a score indicating a similarity between the first text and the second text, and correct the first text based on the calculated score, by using the text comparison module 2536 included in the correction module 2530.

The electronic device 2000 may sequentially compare the semantic element in the second text for correction by the user with the correction candidate semantic elements determined by the correction candidate determination module 2534, based on the determined correction priority. The electronic device 2000 may correct a semantic element in the first text, based on a result of comparing the correction candidate semantic elements with the semantic element in the second text. The electronic device 2000 may determine that the correction candidate semantic element and the semantic element in the second text are similar, based on a similarity score between the correction candidate semantic element and the semantic element in the second text. Here, the electronic device 2000 may replace the correction candidate semantic element determined to be similar to the semantic element in the second text, with the semantic element in the second text.

After operation S380, the electronic device 2000 may perform operation S320 again to analyze the corrected first text.

Figure 4:
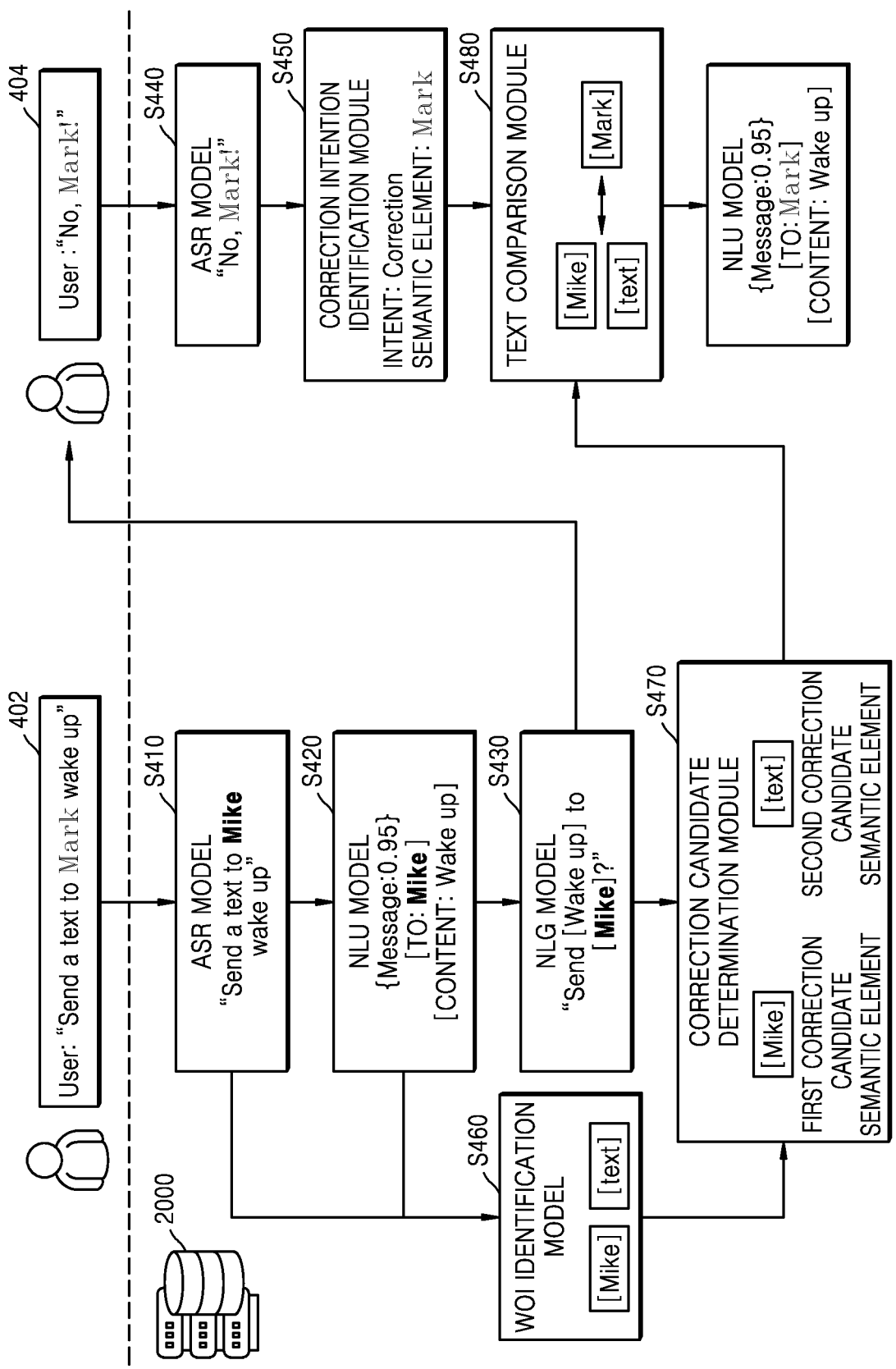
FIG. 4 is a diagram for further describing FIG. 3 and for describing an example in which an electronic device corrects a speech signal input from a user, according to an embodiment of the disclosure.

FIG. 4 is a diagram for further describing FIG. 3 and for describing an example in which the electronic device 2000 corrects a speech signal input from a user, according to an embodiment of the disclosure.

Referring to FIG. 4, the electronic device 2000 according to an embodiment of the disclosure may receive a first speech signal 402 uttered by a user. Here, a conversation sentence of the first speech signal 402 may be "Send a text to Mark wake up".

In operation S410, the electronic device 2000 according to an embodiment of the disclosure may obtain first text "Send a text to Mike wake up", i.e., a sentence obtained by transcribing the first speech signal 402, by performing ASR on the received first speech signal 402. Here, a conversation sentence uttered by the user may be different from a conversation sentence of the first text due to noise or the like in the first speech signal 402 or an inaccurate result of performing the ASR. For example, the conversation sentence of the first speech signal 402 uttered by the user may be "Send a text to Mark wake up.", whereas a conversation sentence output by the electronic device 2000 by recognizing the first speech signal 402 may be "Send wake up to Mike?". In other words, the user has uttered to send a message to Mark, but the electronic device 2000 may recognize Mike. Operation S410 may correspond to operation S310 of FIG. 3.

In operation S420, the electronic device 2000 according to an embodiment of the disclosure may identify an intent of the first speech signal 402, a confidence score of the intent, and entities indicating components of the conversation sentence, by applying the obtained first text to the NLU model 2522. For example, the electronic device 2000 may obtain "message" as the intent of the first speech signal 402, "0.95" as the confidence score of the intent, and "Mike" and "Wake up" as the entities. Operation S420 may correspond to operation S320 of FIG. 3.

In operation S430, the electronic device 2000 according to an embodiment of the disclosure may output a confirmation request for confirming a command of the user identified as a result of analyzing the first text, by using the NLG model 2524. To confirm whether the user wants to send a message to Mike, the electronic device 2000 may output a conversation sentence "Send Wake up to Mike?". Here, the conversation sentence output from the electronic device 2000 may be in a form of audio or text, but is not limited thereto. Operation S430 may correspond to operation S330 of FIG. 3.

The user of the electronic device 2000 according to an embodiment of the disclosure may additionally utter a speech in response to the confirmation request output in operation S430. When it is determined that the confirmation request output from the electronic device 2000 is based on a result of misrecognizing a speech of the user, the user may utter a second speech signal 404 for correcting the misrecognized result. For example, a conversation sentence of the second speech signal 404 may be "No, Mark!". The electronic device 2000 may receive the second speech signal 404 uttered by the user and correct a result of recognizing the first speech signal 402 based on the received second speech signal 404.

In operation S440, the electronic device 2000 according to an embodiment of the disclosure may perform ASR on the received second speech signal 404. The electronic device 2000 may obtain second text "No, Mark!", i.e., a sentence obtained by transcribing the second speech signal 404. Operation S440 may correspond to operation S340 of FIG. 3.

In operation S450, the electronic device 2000 according to an embodiment of the disclosure may identify an intention of the second speech signal 404 that is a subsequent utterance of the user, by using the correction intention identification module 2532. For example, the electronic device 2000 may identify whether the second speech signal 404 is a speech signal for correcting the first text, i.e., the result of speech-recognizing the first speech signal 402. For example, the electronic device 2000 may identify "Correction" as the intent of the second speech signal 404 and "Mark" as a semantic element for correction by the user. Operation S450 may correspond to operation S350 of FIG. 3.

In operation S460, when the second speech signal 404 is identified as the speech signal for correcting the first text, the electronic device 2000 according to an embodiment of the disclosure may identify a plurality of correction candidate semantic elements in the first text. Here, the electronic device 2000 may identify the plurality of correction candidate semantic elements by using the WOI identification model 2535. For example, the electronic device 2000 may identify "Mike" and "text" as the correction candidate semantic elements that may be correction targets in the first text, with respect to the first text "Send a text to Mike wake up". The WOI identification model 2535 according to an embodiment of the disclosure may output the correction candidate semantic elements that may be the correction targets in the first text, by receiving at least some of the intent of the first speech signal 402, the confidence score of the intent, and the entities, which are output by applying the first text to the NLU model 2522. The electronic device 2000 may compare the correction candidate semantic elements with a semantic element for correction by the user in the second text, and correct at least one of the correction candidate semantic elements based on a result of the comparison.

The plurality of correction candidate semantic elements output from the WOI identification model 2535 may be labeled with different labels. For example, the WOI identification model 2535 may output a first correction candidate semantic element "Mike" and a second correction candidate semantic element "text", as the correction candidate semantic elements labeled with different labels. Based on the labels of the correction candidate semantic elements, the electronic device 2000 may determine an order of comparing the correction candidate semantic elements that may be correction targets in the first text with a semantic element in the second text. Operation S460 may correspond to operation S360 of FIG. 3.

In operation S470, the electronic device 2000 according to an embodiment of the disclosure may determine a correction priority, i.e., an order of comparing the correction candidate semantic elements with the semantic element in the second text, by using the correction candidate determination module 2534. Here, the correction priority may be determined based on the labels of the correction candidate semantic elements. The correction priority for comparing the correction candidate semantic elements will be described in detail with reference to FIGS. 8 through 13. Operation S470 may correspond to operation S370 of FIG. 3.

In operation S480, the electronic device 2000 according to an embodiment of the disclosure may compare the correction candidate semantic element with the semantic element in the second text, by using the text comparison module 2536. According to an embodiment of the disclosure, when there is a plurality of correction candidate semantic elements, the electronic device 2000 may sequentially compare the plurality of correction candidate semantic elements based on the correction priority determined in operation S470. According to an embodiment of the disclosure, the correction priority determined in operation S470 may be that the first correction candidate semantic element is first compared with the semantic element in the second text. For example, the electronic device 2000 may first compare the first correction candidate semantic element "Mike" with the semantic element "Mark" in the second text for correction by the user. The electronic device 2000 may calculate a difference value by comparing the first correction candidate semantic element "Mike" and the semantic element "Mark" in the second text. When the calculated difference value is smaller than or equal to a certain threshold value, the electronic device 2000 may correct the first text by replacing "Mike" in the first text with "Mark". Operation S480 may correspond to operation S380 of FIG. 3.

According to an embodiment of the disclosure, the electronic device 2000 may analyze the first text by applying the corrected first text to the NLU model 2522. The electronic device 2000 may obtain "message" as the intent of the first speech signal 402, "0.95" as the confidence score of the intent, and "Mark" and "Wake up" as the entities, by analyzing the corrected first text.

As a result of analyzing the corrected first text, the electronic device 2000 may re-output a confirmation request message for confirming with the user whether to perform an operation according to the corrected first text. For example, to confirm whether the user wants to send a message to Mark, the electronic device 2000 may output a conversation sentence "Send Wake up to Mark?".

Figure 5:
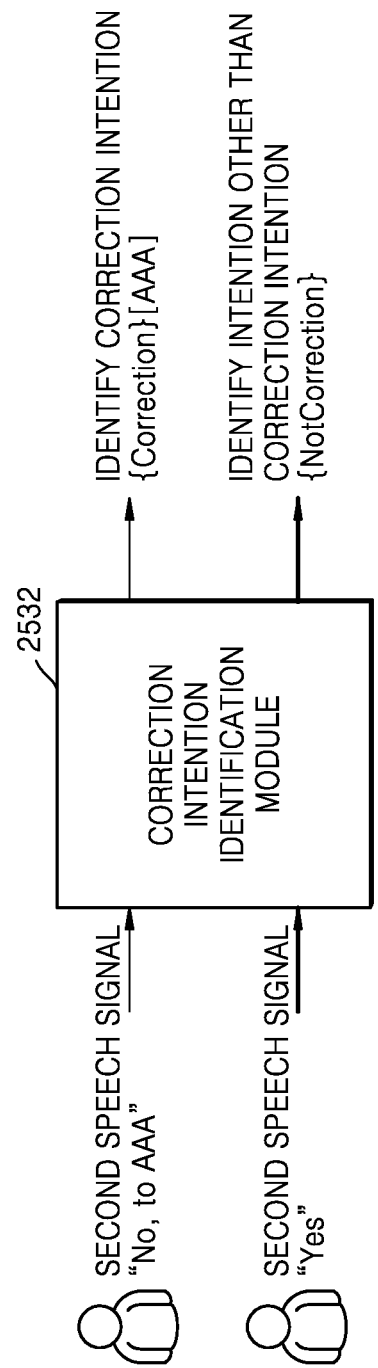
FIG. 5 is a diagram for describing a method, performed by an electronic device, of identifying a correction intention from an utterance of a user, according to an embodiment of the disclosure.

FIG. 5 is a diagram for describing a method, performed by the electronic device 2000, of identifying a correction intention from an utterance of a user, according to an embodiment of the disclosure.

According to an embodiment of the disclosure, the electronic device 2000 may identify an intention of a second speech signal of a user by using the correction intention identification module 2532. The electronic device 2000 may identify whether the second speech signal of the user is a speech signal for correcting a first speech signal, with respect to the second speech signal of the user additionally input after the first speech signal is input.

According to an embodiment of the disclosure, the correction intention identification module 2532 may analyze a correction intention of the user by using a rule-based analysis method. The correction intention identification module 2532 may identify whether the second speech signal is a speech signal for correcting first text, based on whether second text obtained by converting the second speech signal includes a word (e.g., "No") indicating an intention of the user to correct content of the first text. Also, the correction intention identification module 2532 may identify a semantic element in the second text, which indicates a word uttered by the user to correct a semantic element in the first text.

For example, when a conversation sentence of the second speech signal is "No, to AAA", the correction intention identification module 2532 may identify a word "No" from the second text, which indicates an intention of the user to correct the first text, and identify a semantic element "AAA" indicating a word uttered by the user to correct a semantic element in the first text.

As another example, the correction intention identification module 2532 may identify whether the second speech signal is a speech signal for approving the first text, based on whether the second text obtained by converting the second speech signal includes a word (e.g., "Yes" or "OK") indicating an intention of the user to approve the content of the first text.

According to an embodiment of the disclosure, the correction intention identification module 2532 may parse the second text by using the NLU model 2522, and identify an intent indicating an utterance intention of the second speech signal and entities indicating components of a sentence of the second speech signal. The electronic device 2000 may identify whether the second speech signal is the speech signal for correcting the first text, based on whether the identified intent of the second speech signal is an intent included in a "correction" domain. Also, the correction intention identification module 2532 according to an embodiment of the disclosure may identify the semantic element in the second text, which indicates the word uttered by the user to correct the semantic element in the first text.

Figure 6:
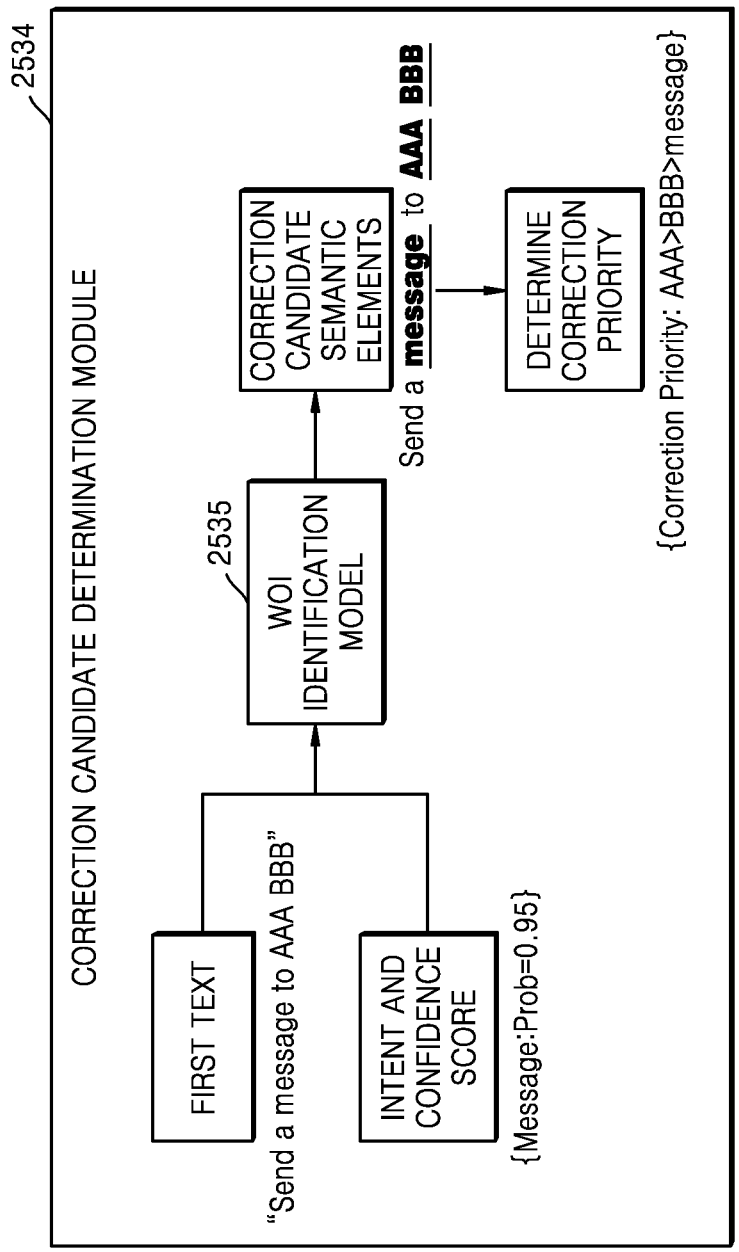
FIG. 6 is a diagram for describing a method, performed by an electronic device, of identifying correction candidate semantic elements to correct text obtained from an utterance of a user, and determining a correction priority, according to an embodiment of the disclosure.

FIG. 6 is a diagram for describing a method, performed by the electronic device 2000, of identifying correction candidate semantic elements to correct text obtained from an utterance of a user, and determining a correction priority, according to an embodiment of the disclosure.

Referring to FIG. 6, the electronic device 2000 according to an embodiment of the disclosure may identify, from a first speech signal of a user, correction candidate semantic elements to be corrected, by using the correction candidate determination module 2534. The electronic device 2000 may determine a correction priority that is an order of comparing the identified correction candidate semantic elements with a semantic element in second text.

The WOI identification model 2535 according to an embodiment of the disclosure may receive, as inputs, first text converted from the first speech signal, an intent of the first speech signal, and a confidence score of the intent of the first speech signal, and output a plurality of correction candidate semantic elements that may be correction targets in the first text. Here, the WOI identification model 2535 may be an artificial intelligence model generated via training.

For example, the WOI identification model 2535 may receive inputs of the first text "Send a message to AAA BBB" converted from the first speech signal of the user, the intent "message" of the first speech signal, and the confidence score "0.95" of the intent of the first speech signal, and output correction candidate semantic elements "message", "AAA", and "BBB", which may be the correction targets in the first text.

The correction candidate determination module 2534 according to an embodiment of the disclosure may determine the correction priority of the correction candidate semantic elements output from the WOI identification model 2535. For example, the correction candidate determination module 2534 may classify the plurality of correction candidate semantic elements based on a certain standard, and determine a priority of correcting the classified correction candidate semantic elements, based on the confidence score of the intent of the first speech signal. A detailed method by which the correction candidate determination module 2534 determines the priority of the correction candidate semantic elements, based on the confidence score of the intent of the first speech signal, will be described in detail with reference to FIGS. 8 through 10.

According to another embodiment, the priority of correcting the plurality of correction candidate semantic elements output from the WOI identification model 2535 may be pre-determined. In this case, the semantic elements in the first text may be corrected based on the correction priority and the plurality of correction candidate semantic elements output from the WOI identification model 2535. An embodiment in which the correction priority of correcting the correction candidate semantic elements, which is used in the WOI identification model 2535, is pre-determined will be described in detail with reference to FIGS. 11 and 12.

The WOI identification model 2535 according to an embodiment of the disclosure may be an artificial intelligence model capable of performing natural language understanding, by integrating with a function performed by the NLU model 2522. According to an embodiment of the disclosure, the WOI identification model 2535 may be trained to receive an input of text obtained by using the ASR model 2512, parse the text, and identify an intent indicating an utterance intention of a speech signal corresponding to the text and entities indicating components of a sentence of the text. Also, the WOI identification model 2535 may be trained to identify semantic elements indicating WOIs that are correction targets in the input text, based on the input text, the intent of the speech signal identified by the WOI identification model 2535, and a confidence score of the intent.

Figure 7:
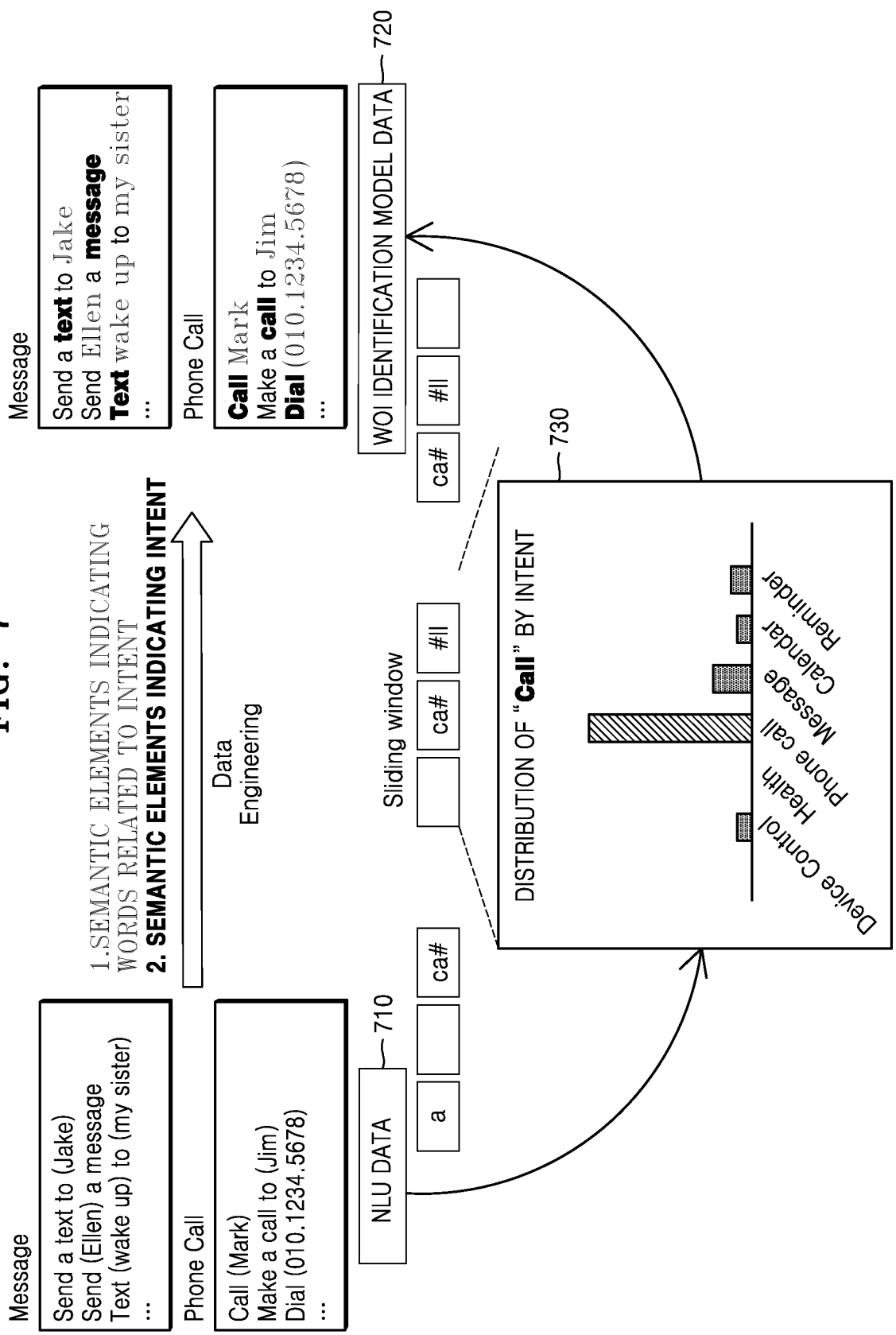
FIG. 7 is a diagram for describing data used by a word of interest identification model of an electronic device for identifying a correction candidate semantic element, according to an embodiment of the disclosure.

FIG. 7 is a diagram for describing data used by the WOI identification model 2535 of the electronic device 2000 for identifying a correction candidate semantic element, according to an embodiment of the disclosure.

Referring to FIG. 7, the electronic device 2000 according to an embodiment of the disclosure may generate WOI identification model data 720 by processing NLU data 710 output from the NLU model 2522, via data engineering.

According to an embodiment of the disclosure, the NLU data 710 output from the NLU model 2522 may be an intent indicating an utterance intention, a confidence score of the intent, and entities indicating components of a sentence. The electronic device 2000 may generate the WOI identification model data 720 by processing the NLU data 710 classified for each intent. In this case, the WOI identification model data 720 may include semantic elements indicating words related to an intent of a first speech signal, and a semantic element indicating the intent of the first speech signal.

According to an embodiment of the disclosure, conversation sentences classified as an intent of a "message" by the NLU model 2522 may be "Send a text to Jake", "Send Ellen a message", "Text wake up to my sister", and the like. The electronic device 2000 may identify a semantic element indicating an intent and a semantic element indicating a word related to the intent, for each conversation sentence.

For example, when the conversation sentence is "Send a text to Jake", the semantic element indicating the intent may be a word "text" corresponding to a meaning of the intent "message" of the conversation sentence. Also, the semantic element indicating the word related to the intent may be a word "Jake" indicating a target for transmitting a message.

As another example, when the conversation sentence is "Send Ellen a message", the semantic element indicating the intent may be a word "message" corresponding to the meaning of the intent "message" of the conversation sentence. Also, the semantic element indicating the word related to the intent may be a word "Ellen" indicating a target for transmitting a message.

As another example, when the conversation sentence is "Text wake up to my sister", the semantic element indicating the intent may be a word "text" corresponding to a meaning of the intent "message" of the conversation sentence. Also, the semantic elements indicating the words related to the intent may be a word "my sister" indicating a target for transmitting a message, and a word "wake up" indicating content of the message to be transmitted.

According to an embodiment of the disclosure, to identify the semantic element indicating the intent, the electronic device 2000 may determine the semantic element indicating the intent, based on statistics in which specific words in a conversation sentence are classified according to intents.

According to an embodiment of the disclosure, the electronic device 2000 may apply a sliding window algorithm to the conversation sentence to identify a plurality of words in the conversation sentence and determine whether each word is a word indicating the intent. For a specific word "call" included in a conversation sentence "Make a call to Jim", the electronic device 2000 may obtain statistics 730 in which the word "call" is classified by intent. Based on the obtained statistics 730, the electronic device 2000 may determine a domain of the intent of the word "call". Here, referring to the statistics 730 in which the word "call" is classified by intent, there are more cases where the intent of the word "call" has been classified as an intent "phone call" than cases where the intent of the word "call" has been classified as another intent (e.g., message, reminder, and the like), and thus, the electronic device 2000 may determine the word "call" as a semantic element indicating the intent "phone call".

According to the above embodiments of the disclosure, the electronic device 2000 according to an embodiment may generate the WOI identification model data 720 by determining, from conversation sentences included in the intent "message", semantic elements indicating words related to the intent and semantic elements indicating the intent.

In a same manner, the electronic device 2000 may generate the WOI identification model data 720 by determining, from conversation sentences included in the intent "phone call", semantic elements indicating words related to the intent and semantic elements indicating the intent.

The electronic device 2000 according to an embodiment of the disclosure may generate the WOI identification model data 720 by using the NLU data 710 obtained by applying a plurality of conversation sentences to the NLU model 2522. The electronic device 2000 may train the WOI identification model 2535 by using the generated WOI identification model data 720.

Figure 8:
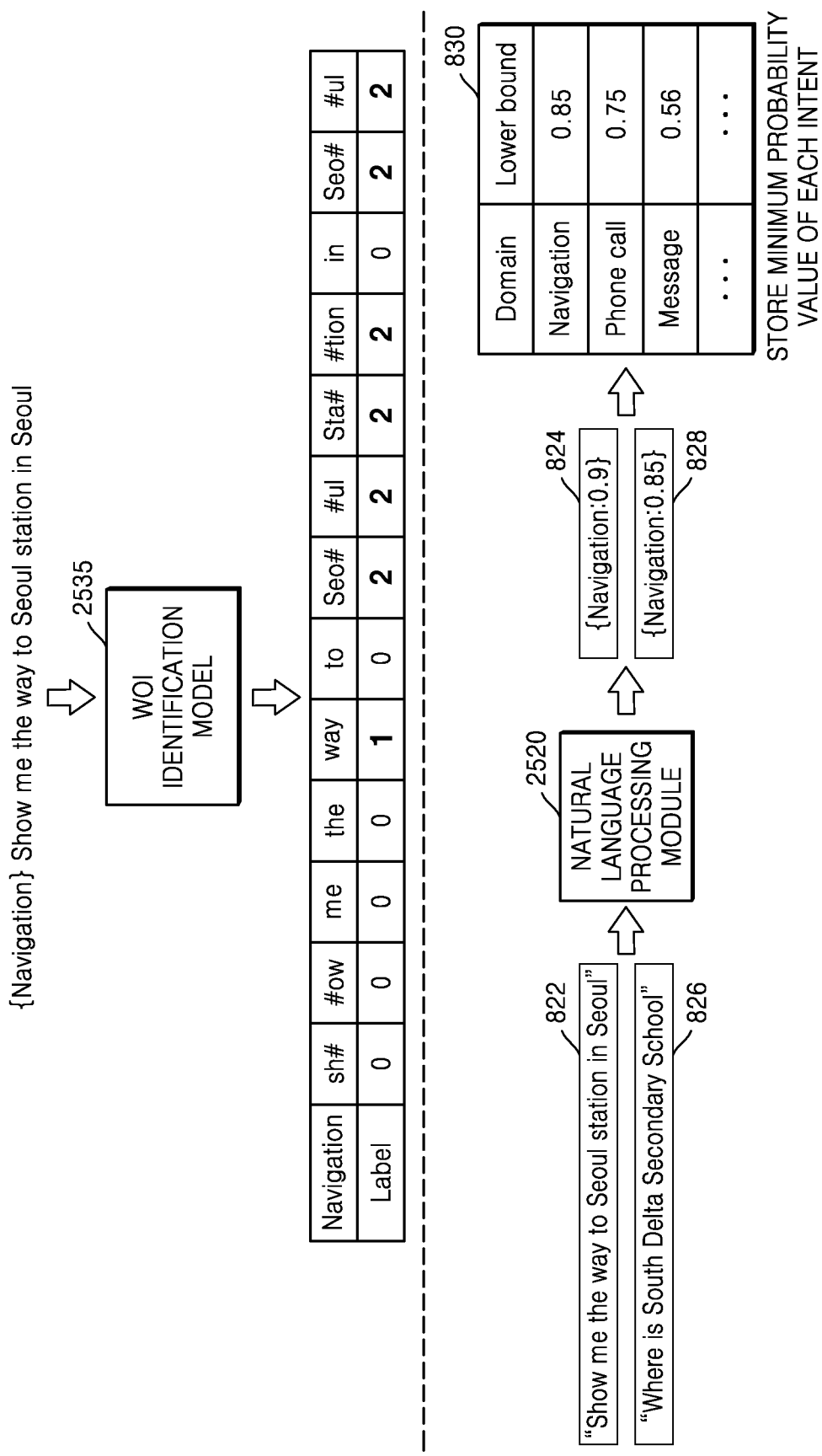
FIG. 8 is a diagram for describing a method, performed by an electronic device, of training an artificial intelligence model for identifying a correction candidate semantic element, according to an embodiment of the disclosure.

FIG. 8 is a diagram for describing a method, performed by the electronic device 200, of training an artificial intelligence model for identifying a correction candidate semantic element, according to an embodiment of the disclosure.

Referring to FIG. 8, the electronic device 2000 according to an embodiment of the disclosure may train the WOI identification model 2535 by using the WOI identification model data 720 described in FIG. 7.

The electronic device 2000 may train the WOI identification model 2535 by processing pieces of text obtained from a plurality of conversation sentences. Hereinafter, for convenience of description, text obtained from a conversation sentence "Show me the way to Seoul station in Seoul" will be described as an example of data for training the WOI identification model 2535.

According to an embodiment of the disclosure, as a result of the electronic device 2000 analyzing the text "Show me the way to Seoul station in Seoul" by using the NLU model 2522 of the natural language processing module 2520, an intent of the conversation sentence may be "navigation", a semantic element indicating the intent "navigation" may be "way", and semantic elements indicating words related to the intent may be "Seoul station" and "Seoul".

The electronic device 2000 may label a plurality of semantic elements in the text with different labels, and train the WOI identification model 2535 based on the labeled semantic elements. For example, the electronic device 2000 may label the semantic element "way" indicating the intent to "1" and label the semantic elements "Seoul station" and "Seoul" indicating the words related to the intent to "2". According to an embodiment of the disclosure, the electronic device 2000 may label the WOI identification model data 720 in units of words, but an embodiment of the disclosure is not limited thereto, and the electronic device 2000 may label the WOI identification model data 720 in units of certain tokens (for example, units of phonemes or syllables) usable by the WOI identification model 2535.

Also, the electronic device 2000 according to an embodiment of the disclosure may generate a reference table 830 in which minimum values of confidence scores are stored for each domain of intent.

The electronic device 2000 may perform natural language understanding by applying a plurality of conversation sentences to the natural language processing module 2520, and obtain an intent of each conversation sentence and a confidence score of the intent.

According to an embodiment of the disclosure, the electronic device 2000 may classify the confidence scores of the intent obtained for the plurality of conversation sentences according to domains of the intent. The electronic device 2000 may generate the reference table 830 by storing the minimum values of the confidence scores classified according to the domains of the intent.

For example, the electronic device 2000 may apply text of a first conversation sentence 822 "Show me the way to Seoul station in Seoul" to the natural language processing module 2520 to obtain an intent of the first conversation sentence 822 and a confidence score 824 "Navigation:0.9" of the intent of the first conversation sentence 822. Also, the electronic device 2000 may apply text of a second conversation sentence 826 "Where is South Delta Secondary School" to the natural language processing module 2520 to obtain an intent of the second conversation sentence 826 and a confidence score 828 "Navigation:0.85" of the intent of the second conversation sentence 826. Here, the electronic device 2000 may set a value of a domain "navigation" among domains of intent in the reference table 830 to 0.85, i.e., the minimum value among the obtained confidence scores of the intent. In other words, the electronic device 2000 may store, with respect to the domain "navigation" of intent in the reference table 830, the minimum value among the confidence scores of the intent of the conversation sentences classified as the domain "navigation", in the reference table 830.

Figure 9:
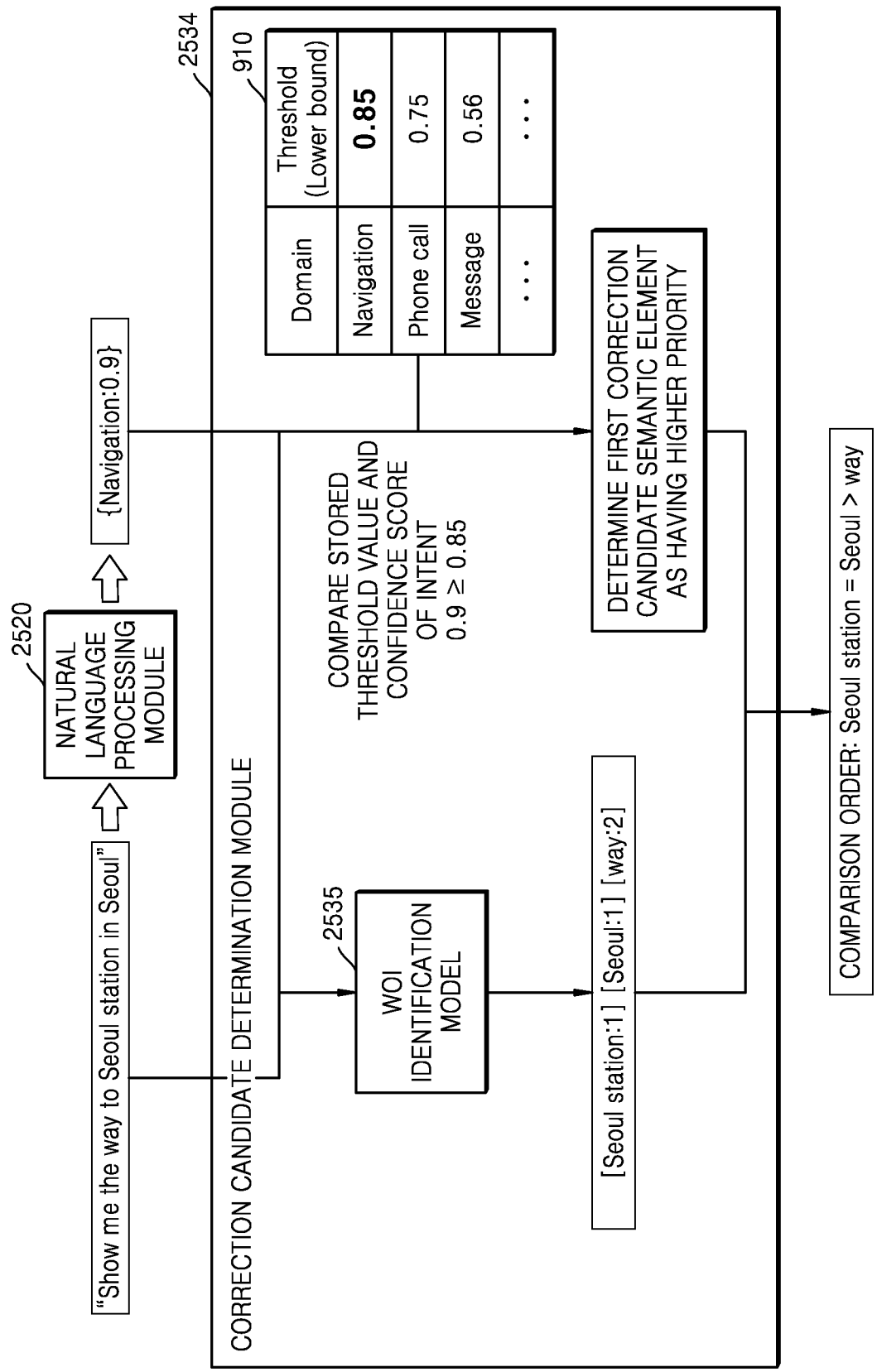
FIG. 9 is a diagram for describing a method, performed by an electronic device, of identifying correction candidate semantic elements by using an artificial intelligence model, and determining an order of correcting the identified correction candidate semantic elements, according to an embodiment of the disclosure.

FIG. 9 is a diagram for describing a method, performed by the electronic device 2000, of identifying correction candidate semantic elements by using an artificial intelligence model, and determining an order of correcting the identified correction candidate semantic elements, according to an embodiment of the disclosure.

Referring to FIG. 9, the electronic device 2000 according to an embodiment of the disclosure may use the correction candidate determination module 2534 to identify a plurality of correction candidate semantic elements in first text and determine an order of correcting the identified correction candidate semantic elements.

Hereinafter, for convenience of description, the method will be described with an example in which the first text is "Show me the way to Seoul station in Seoul".

According to an embodiment of the disclosure, the electronic device 2000 may obtain an intent of a first speech signal and a confidence score of the intent by inputting the first text converted from the first speech signal to the natural language processing module 2520. For example, the electronic device 2000 may apply the first text corresponding to a conversation sentence "Show me the way to Seoul station in Seoul" to the natural language processing module 2520, and obtain an intent "navigation" of the first speech signal and a confidence score "0.9" of the intent.

According to an embodiment of the disclosure, the electronic device 2000 may identify a plurality of correction candidate semantic elements by using the WOI identification model 2535. In this case, the WOI identification model 2535 may output labeled correction candidate semantic elements to determine a comparison order of words that may be correction targets in the conversation sentence of the first speech signal.

For example, the electronic device 2000 may input, to the WOI identification model 2535, the first text "Show me the way to Seoul station in Seoul" and the intent "navigation" and identify first correction candidate semantic elements "Seoul station" and "Seoul", which are labeled in a label number "1". Also, the electronic device 2000 may identify a second correction candidate semantic element "way" that is labeled in a label number "2". Here, the first correction candidate semantic element may be a semantic element related to the intent "navigation", and the second correction candidate semantic element may be a semantic element indicating the intent "navigation".

According to an embodiment of the disclosure, the electronic device 2000 may tag semantic elements by assigning a certain tag to each of the semantic elements so as to distinguish a boundary between the semantic elements. Here, an inside-outside-beginning (IOB) tagging format may be used as a method by which the electronic device 2000 tags the semantic elements, but the method is not limited thereto. The electronic device 2000 may tag a plurality of tokens configuring the semantic elements. For example, a token indicating the beginning of a semantic element may be tagged as "B" (beginning), a token included in the semantic element may be tagged as "I" (inside), and a token not corresponding to the semantic element may be tagged as "O" (outside). In particular, with respect to the semantic element "Seoul", the electronic device 2000 may assign a "B" tag to "S" that is a beginning token of the semantic element and an "I" tag to each of "e", "o", "u", and "I" that are tokens included in the semantic element.

According to an embodiment of the disclosure, the electronic device 2000 may expand labeling of the semantic elements by assigning a certain tag to the semantic elements labeled according to the above embodiments of the disclosure. For example, the electronic device 2000 may expand labeling of the semantic element "Seoul" by assigning a tag in an IOB tagging format to the first correction candidate semantic element "Seoul" labeled in the label number "1". In particular, with respect to the semantic element "Seoul" labeled in the label number "1", the electronic device 2000 may expand labeling corresponding to the beginning token of the semantic element to "1-B" by assigning the "B" tag to the beginning token "S" of the semantic element, and expand labeling of the tokens included in the semantic element to "1-I" by assigning the "I" tag to each of "e", "o", "u", and "I" that are the tokens included in the semantic element.

The electronic device 2000 tags tokens configuring a semantic element by assigning certain tags so as to distinguish a boundary between semantic elements, thereby distinguishing the boundary between the semantic elements even when same correction candidate semantic elements are continuously identified in text.

According to an embodiment of the disclosure, the electronic device 2000 may determine an order of comparing the plurality of correction candidate semantic elements with a semantic element of second text.

According to an embodiment of the disclosure, the electronic device 2000 may compare, by using the correction candidate determination module 2534, the intent "navigation" of the first speech signal and the confidence score "0.9" of the intent with a threshold value in a reference table 910. In this case, a threshold value "0.85" stored in a domain "navigation" of the reference table 910 may be compared with the confidence score "0.9" of the intent of the first speech signal.

According to an embodiment of the disclosure, because the confidence score "0.9" of the intent "navigation" of the first speech signal is greater than the threshold value "0.85" stored in the reference table 910, the correction candidate determination module 2534 may determine that confidence of the intent is high and thus a possibility of a user correcting a semantic element corresponding to the intent is low. Accordingly, the correction candidate determination module 2534 may determine the first correction candidate semantic element indicating the semantic element related to the intent as having a higher correction priority than the second correction candidate semantic element that is the semantic element indicating the intent. In this case, when the second speech signal is input to correct the first speech signal, the semantic element in the second speech signal may be compared first with the first correction candidate semantic elements "Seoul station" and "Seoul".

In the above embodiment of the disclosure, there are a plurality of first correction candidate semantic elements (e.g., "Seoul station" and "Seoul") compared with the semantic element in the second text. When there are several first correction candidate semantic elements, the electronic device 2000 may determine a comparison order for comparing the first correction candidate semantic elements with the semantic element in the second speech signal.

For example, the electronic device 2000 may determine the comparison order such that a correction candidate semantic element located in front of a sentence of the first text is first compared. The electronic device 2000 may compare the first correction candidate semantic elements with the semantic element in the second text sequentially from the first correction candidate semantic element located in front of the sentence of the first text. The electronic device 2000 may correct the first correction candidate semantic element when it is determined that the first correction candidate semantic element is similar to the semantic element in the second text and thus is a correction target, as a result of comparing the first correction candidate semantic element with the semantic element in the second text. However, a method by which the electronic device 2000 determines an order of comparing the plurality of first correction candidate semantic elements with the semantic element in the second speech signal is not limited thereto.

As another example, the electronic device 2000 may compare each of the plurality of first correction candidate semantic elements in the first text with the semantic element in the second text, and determine, as the correction target, the first correction candidate semantic element having highest similarity to the semantic element in the second text, from among the plurality of first correction candidate semantic elements. The electronic device 2000 may correct the first correction candidate semantic element determined as the correction target. According to another embodiment of the disclosure, the confidence score of the intent "navigation" of the first speech signal may be smaller than the threshold value "0.85" stored in the reference table 910. In this case, because confidence of the identified intent is low, the correction candidate determination module 2534 may determine that a possibility of the user correcting the semantic element corresponding to the intent is high. Accordingly, the correction candidate determination module 2534 may determine the second correction candidate semantic element that is the semantic element indicating the intent as having a higher correction priority than the first correction candidate semantic element that is the semantic element related to the intent. In the above embodiment of the disclosure, there may be a plurality of second correction candidate semantic elements compared with the semantic element in the second text. When there are several second correction candidate semantic elements, the electronic device 2000 may determine a comparison order for comparing the second correction candidate semantic elements with the semantic element in the second speech signal. This is the same as a case where there are several first correction candidate semantic elements, and thus descriptions thereof are omitted.

Figure 10:
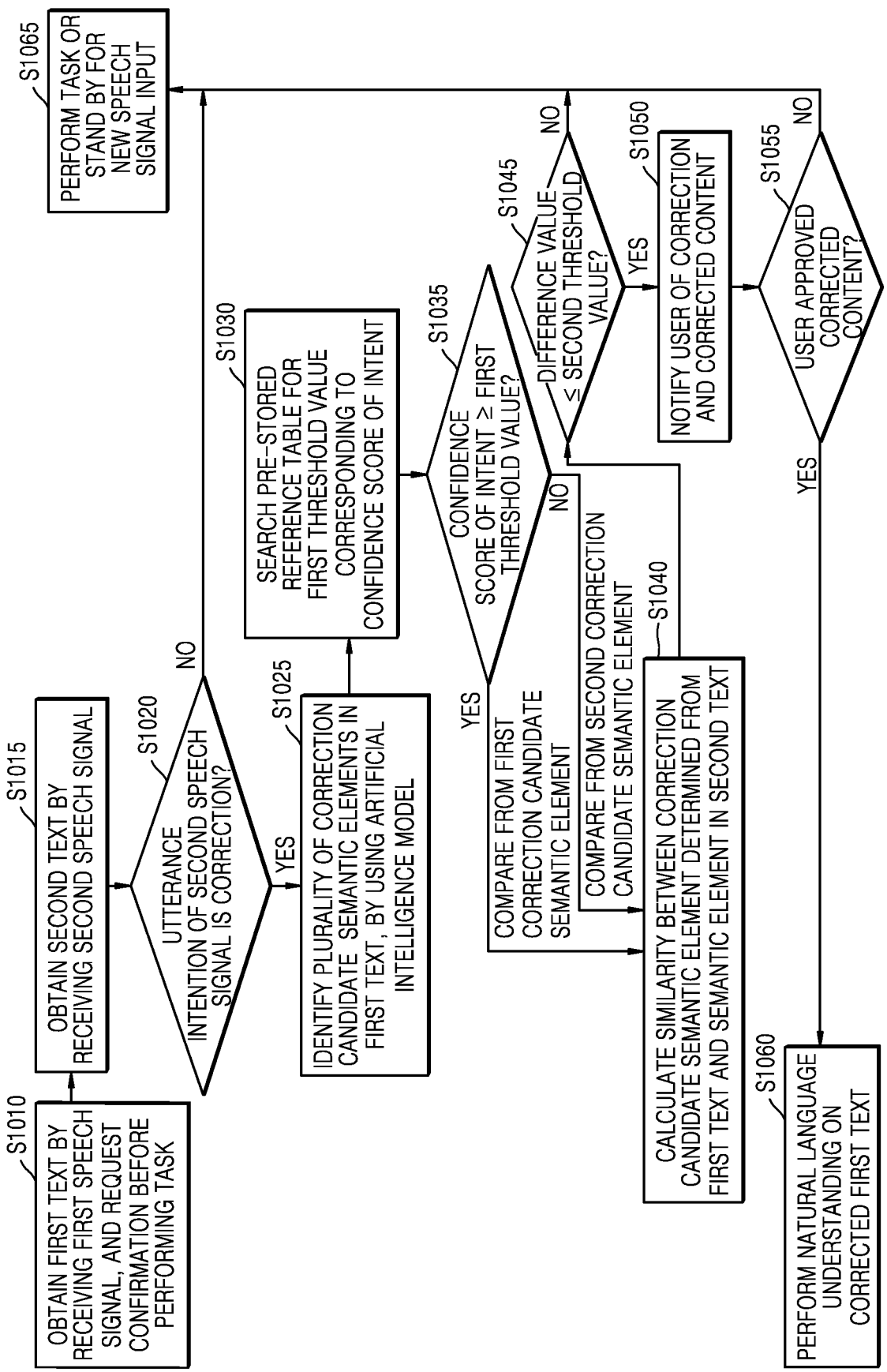
FIG. 10 is a diagram for describing a method, performed by an electronic device, of correcting an utterance of a user, according to the methods of described with reference to FIGS. 8 and 9, according to an embodiment of the disclosure.

FIG. 10 is a diagram for describing a method, performed by the electronic device 2000, of correcting an utterance of a user, according to the methods of described with reference to FIGS. 8 and 9, according to an embodiment of the disclosure.

While describing FIG. 10, description about operations that have been described with reference to FIGS. 3 and 4 is omitted.

According to an embodiment of the disclosure, operation S1010 may correspond to operations S310 through S330 of FIG. 3, and operations S1015 through S1025 may correspond to operations S340 through S350 of FIG. 3.

In operation S1030, the electronic device 2000 according to an embodiment of the disclosure may search a pre-stored reference table for a first threshold value corresponding to a confidence score of intent of a first speech signal. For example, when the intent of the first speech signal is "navigation", the electronic device 2000 may search the pre-stored reference table for the first threshold value stored in a "navigation" domain.

In operation S1035, the electronic device 2000 according to an embodiment of the disclosure may determine a correction priority. The electronic device 2000 may compare the confidence score of the intent of the first speech signal with the first threshold value. When the confidence score of the intent of the first speech signal is equal to or greater than the first threshold value, the electronic device 2000 may first compare a first correction candidate semantic element indicating a semantic element related to the intent of the first speech signal with a semantic element in second text. When the confidence score of the intent of the first speech signal is smaller than the first threshold value, the electronic device 2000 may compare a second semantic element indicating the intent of the first speech signal with the semantic element in the second text.

In operation S1040, the electronic device 2000 may calculate similarity between a correction candidate semantic element and the semantic element in the second text, based on the correction priority determined in operation S1035. For example, the electronic device 2000 may calculate a difference value indicating a difference between the correction candidate semantic element in the first text and the semantic element in the second text for correction by the user. A specific method by which the electronic device 2000 calculates the difference value will be described in detail below with reference to FIGS. 13 and 14.

In operation S1045, the electronic device 2000 according to an embodiment of the disclosure may correct at least one semantic element in the first text, based on a result of comparing the difference value calculated in operation S1040 with a second threshold value. When there are a plurality of correction candidate semantic elements identified in the first text, the electronic device 2000 may sequentially compare the correction candidate semantic elements, based on the correction priority determined according to the above embodiment of the disclosure. When the difference value between the correction candidate semantic element in the first text and the semantic element in the second text is equal to or smaller than the second threshold value, the electronic device 2000 may determine the correction candidate semantic element to be a semantic element to be corrected by the user. The electronic device 2000 may perform operation S1050 to correct the correction candidate semantic element, of which the difference value with the semantic element is equal to or smaller than the second threshold value, to the semantic element in the second text for correction by the user.

When it is determined, as a result of comparing the difference values with the second threshold value, that there is no correction candidate semantic element of which the difference value is equal to or smaller than the second threshold value, the electronic device 2000 may perform operation S1065.

In operation S1050, the electronic device 2000 may determine, as a correction target semantic element, a correction candidate semantic element of which the difference value with the semantic element in the second text is smaller than the second threshold value and which is similar to the semantic element in the second text, from among the correction candidate semantic elements. The electronic device 2000 may replace the determined correction target semantic element with the semantic element in the second text, thereby correcting the first text. The electronic device 2000 may notify the user of corrected content and output a confirmation request message requesting confirmation of the user.

When an input of approving the confirmation request output in operation S1050 is received from the user in operation S1055, the electronic device 2000 according to an embodiment of the disclosure may perform operation S1060, and when an input of denying the confirmation request is input in operation S1055, the electronic device 2000 may perform operation S1065. Here, the input of the user may be a speech signal, but is not limited thereto, and another type of data may be input as the input of the user.

In operation S1060, the electronic device 2000 according to an embodiment of the disclosure may perform natural language understanding on the corrected first text, determine an intention of the user corresponding to the corrected first text, and perform a task corresponding to the intention of the user.

In operation S1065, the electronic device 2000 according to an embodiment of the disclosure may perform a recognized task or stand by until a new speech signal is input.

Figure 11:
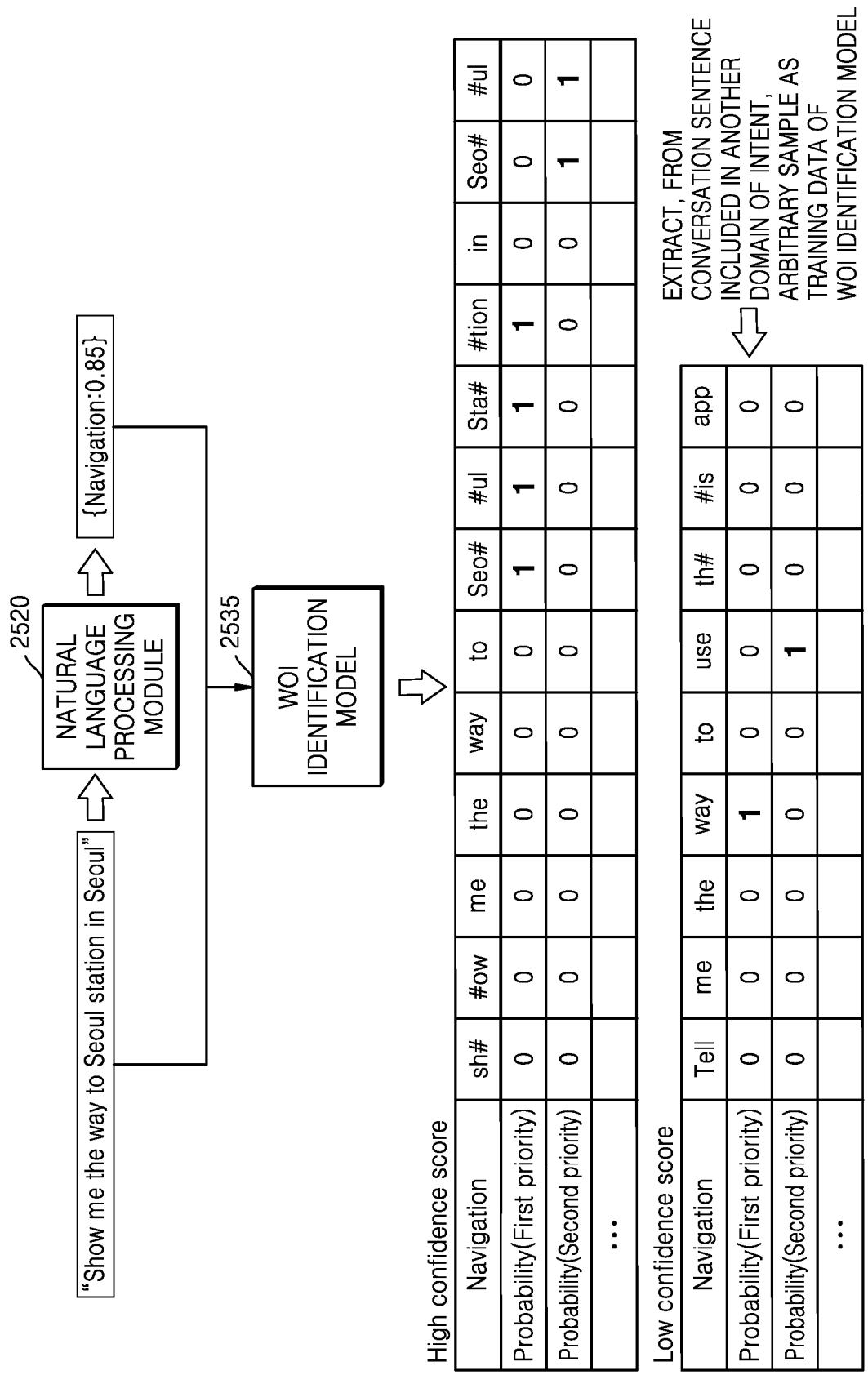
FIG. 11 is a diagram for describing a method, performed by an electronic device, of training an artificial intelligence model for identifying a correction candidate semantic element, according to another embodiment of the disclosure.

FIG. 11 is a diagram for describing a method, performed by the electronic device 2000, of training an artificial intelligence model for identifying a correction candidate semantic element, according to another embodiment of the disclosure.

Referring to FIG. 11, the electronic device 2000 according to an embodiment of the disclosure may train the WOI identification model 2535 by using the WOI identification model data 720 described in FIG. 7.

The electronic device 2000 may train the WOI identification model 2535 by processing pieces of text obtained from a plurality of conversation sentences. Hereinafter, for convenience of description, text obtained from a conversation sentence "Show me the way to Seoul station in Seoul" will be described as an example of data for training the WOI identification model 2535.

According to an embodiment of the disclosure, as a result of the electronic device 2000 analyzing the text "Show me the way to Seoul station in Seoul" by using the NLU model 2522 of the natural language processing module 2520, an intent of the conversation sentence may be "navigation" and semantic elements indicating words related to the intent may be "Seoul station" and "Seoul".

The electronic device 2000 may label a plurality of semantic elements in the text with labels including a priority, and train the WOI identification model 2535 based on the labeled semantic elements. For example, the electronic device 2000 may train the WOI identification model 2535 based on conversation sentences of which a domain of intent is "navigation" and conversation sentences having different domains. At this time, the electronic device 2000 may train the WOI identification model 2535 such that a correction candidate semantic element having a priority is output when a conversation sentence of intent "navigation" is input.

According to an embodiment of the disclosure, the electronic device 2000 may label a priority of the semantic element "Seoul station" corresponding to a place as a first priority correction candidate semantic element, from among the semantic elements indicating the words related to the intent. The electronic device 2000 may train the WOI identification model 2535 such that, when a conversation sentence included in a domain "navigation" is input, a semantic element corresponding to a place is identified as a first priority correction candidate semantic element.

According to an embodiment of the disclosure, the electronic device 2000 may label a priority of the semantic element "Seoul" corresponding to a region as a second priority correction candidate semantic element, from among the semantic elements indicating the words related to the intent. The electronic device 2000 may train the WOI identification model 2535 such that, when a conversation sentence included in a domain "navigation" is input, a semantic element corresponding to a region is identified as a second priority correction candidate semantic element.

According to an embodiment, when it has been identified that an intent of a conversation sentence input to the electronic device 2000 is included in a domain "navigation", but a confidence score of the intent is low, the electronic device 2000 may use conversation sentences of intent "navigation" and conversation sentences included in domains of another intent, as training data, so as to identify correction candidate semantic elements to be output. For example, with respect to a conversation sentence "Tell me the way to use this app" included in a domain of intent other than an intent "navigation", the electronic device 2000 may prioritize and label semantic elements "way", "use", and the like included in text and train the WOI identification model 2535 by using labeled data.

Figure 12:
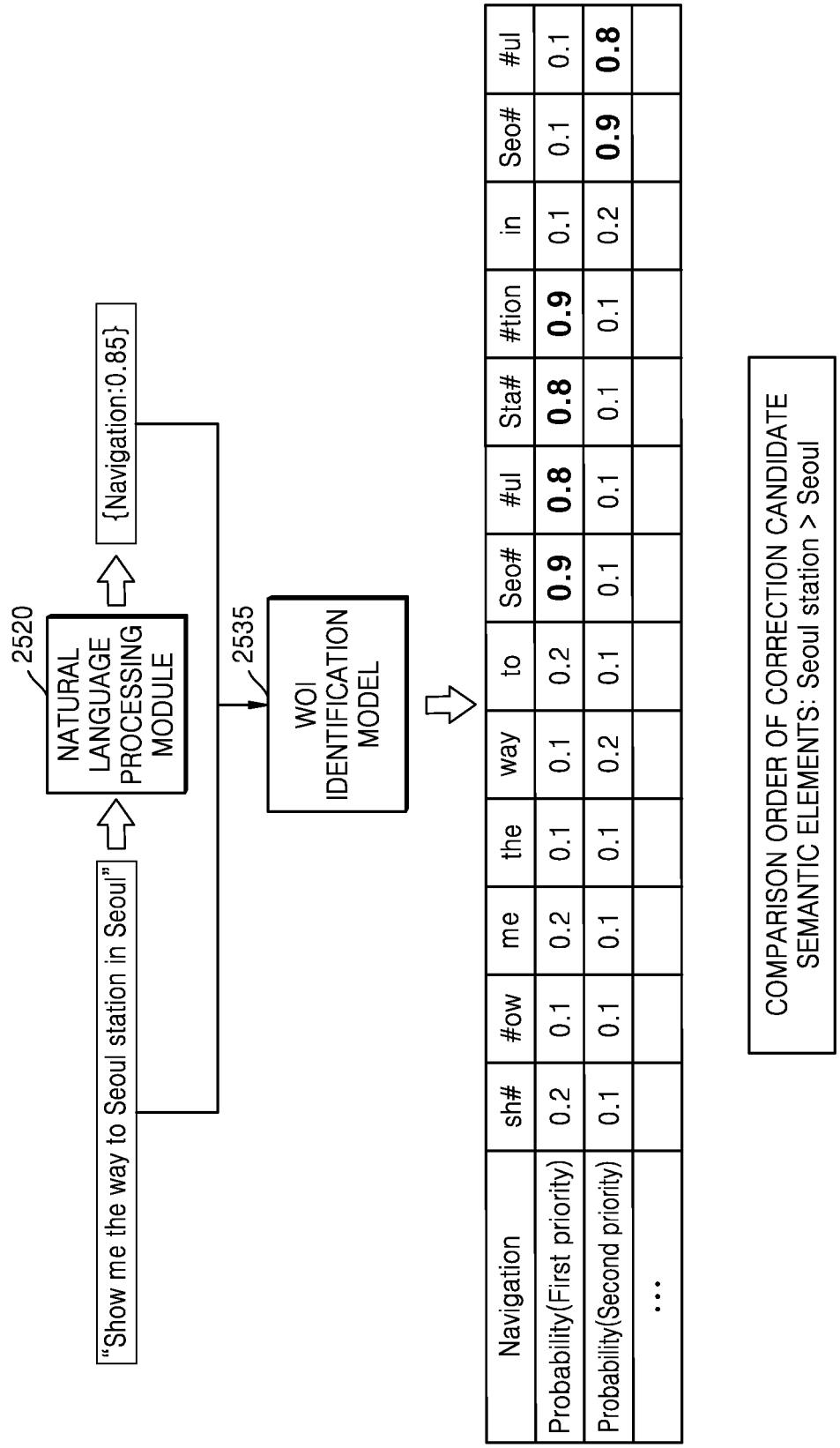
FIG. 12 is a diagram for describing a method, performed by an electronic device, of identifying correction candidate semantic elements by using an artificial intelligence model, and determining an order of correcting the identified correction candidate semantic elements, according to another embodiment of the disclosure.

FIG. 12 is a diagram for describing a method, performed by the electronic device 2000, of identifying correction candidate semantic elements in which a correction priority has been determined, by using an artificial intelligence model, according to another embodiment of the disclosure.

Referring to FIG. 12, the electronic device 2000 according to an embodiment of the disclosure may identify a plurality of correction candidate semantic elements in first text, by using the WOI identification model 2535. Here, the correction candidate semantic elements may be output based on a pre-trained correction priority.

Hereinafter, for convenience of description, the method will be described with an example in which the first text is "Show me the way to Seoul station in Seoul".

According to an embodiment of the disclosure, the electronic device 2000 may obtain an intent of a first speech signal and a confidence score of the intent by inputting the first text converted from the first speech signal to the natural language processing module 2520. For example, the electronic device 2000 may apply the first text corresponding to a conversation sentence "Show me the way to Seoul station in Seoul" to the natural language processing module 2520, and obtain an intent "navigation" of the first speech signal and a confidence score "0.85" of the intent.

According to an embodiment of the disclosure, the electronic device 2000 may identify the plurality of correction candidate semantic elements by using the WOI identification model 2535. At this time, the plurality of correction candidate semantic elements output from the WOI identification model 2535 may be correction candidate semantic elements based on a priority pre-trained according to the embodiment of the disclosure described with reference to FIG. 11.

For example, the electronic device 2000 may input, to the WOI identification model 2535, the first text "Show me the way to Seoul station in Seoul" and the intent "navigation" and identify, as a first priority correction candidate semantic element, a semantic element "Seoul station" corresponding to a place and pre-trained as a first priority according to the embodiment of the disclosure described with reference to FIG. 11. Also, the electronic device 2000 may identify, as a second priority correction candidate semantic element, a semantic element "Seoul" corresponding to a region and pre-trained as a second priority according to the embodiment of the disclosure described with reference to FIG. 11.

The electronic device 2000 according to an embodiment of the disclosure may compare the correction candidate semantic elements with a semantic element in second text for correction by a user, so as to correct the first text. In this case, the electronic device 2000 may compare the correction candidate semantic elements with the semantic element in the second text for correction by the user, based on the correction priority.

Figure 13:
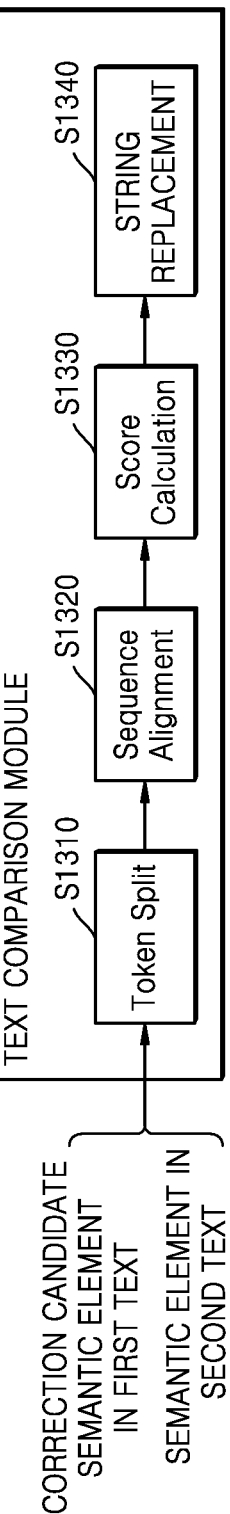
FIG. 13 is a diagram for describing a method, performed by an electronic device, of comparing a correction candidate semantic element in first text and a semantic element in second text, to correct an utterance of a user, according to an embodiment of the disclosure.

FIG. 13 is a diagram for describing a method, performed by the electronic device 2000, of comparing a correction candidate semantic element in first text and a semantic element in second text, to correct an utterance of a user, according to an embodiment of the disclosure.

Referring to FIG. 13, the electronic device 2000 according to an embodiment of the disclosure may, by using the text comparison module 2536, compare the correction candidate semantic elements in the first text and the semantic element in the second text for correction by the user, and correct at least one semantic element in the first text based on a result of the comparison.

According to an embodiment of the disclosure, the text comparison module 2536 may receive inputs of the correction candidate semantic elements in the first text and the semantic element in the second text. When there are a plurality of correction candidate semantic elements in the first text, the correction candidate semantic elements in the first text may be sequentially compared with the semantic element in the second text, based on a correction priority determined according to the embodiments of the disclosure described above.

In operation S1030, the text comparison module 2536 according to an embodiment of the disclosure may tokenize each of the correction candidate semantic elements in the first text and the semantic element in the second text. In this case, tokenization may denote an operation of splitting a semantic element in units defined as tokens. According to an embodiment of the disclosure, units of tokens may be set to units of similar pronunciations, units of syllables, units of phonemes, units of semantics, units of words, or units of sentences, but are not limited thereto.

In operation S1320, the text comparison module 2536 according to an embodiment of the disclosure may apply a sequence alignment algorithm to calculate similarity between tokens obtained by tokenizing the semantic elements. Here, examples of the sequence alignment algorithm include a Needleman-Wunsch algorithm and a sliding window algorithm, but are not limited thereto.

In operation S1330, the text comparison module 2536 according to an embodiment of the disclosure may calculate a similarity score of the tokens aligned in operation S1320. Here, the similarity score may be a score indicating a difference value between the correction candidate semantic element in the first text and the semantic element in the second text. Examples of a method of calculating the similarity score include an edit distance algorithm, a Jaccard similarity algorithm, and a calculation method using a pre-defined lookup table, but are not limited thereto.

In operation S1340, the text comparison module 2536 according to an embodiment of the disclosure may correct the correction candidate semantic element in the first text, based on a result of calculating the similarity score. For example, the text comparison module 2536 may determine the correction candidate semantic element as a correction target semantic element, based on the difference value, i.e., the similarity score. The electronic device 2000 may replace the determined correction target semantic element with the semantic element in the second text, thereby correcting the first text.

Figure 14:
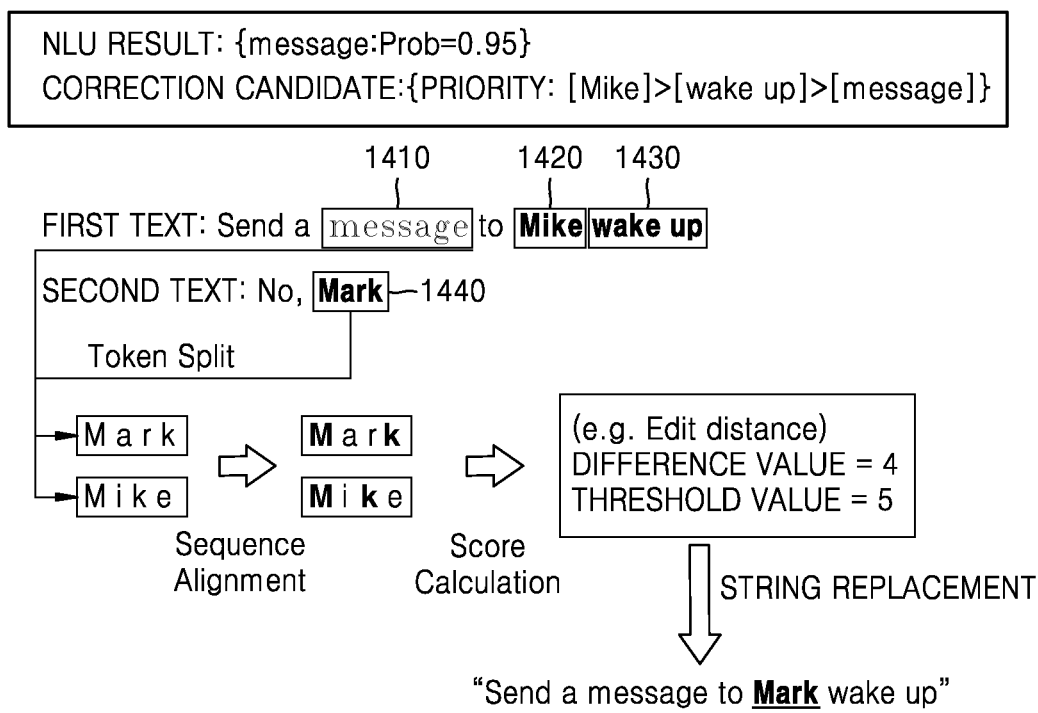
FIG. 14 is a diagram for further describing FIG. 13 and for describing an example in which an electronic device compares semantic elements, according to an embodiment of the disclosure.

FIG. 14 is a diagram for further describing FIG. 13 and for describing an example in which the electronic device 2000 compares semantic elements, according to an embodiment of the disclosure.

FIG. 14 will be described with an example in which a conversation sentence of first text converted from a first speech signal of a user input to the electronic device 2000 is "Send a message to Mike wake up", and a conversation sentence of second text converted from a second speech signal is "No, Mark".

According to an embodiment of the disclosure, the electronic device 2000 may identify a plurality of correction candidate semantic elements that may be correction targets in the first text, according to the embodiments of the disclosure described above. Here, a correction priority of the plurality of correction candidate semantic elements may be in an order of "Mike" 1420, "wake up" 1430, and "message" 1410. The electronic device 2000 may sequentially compare, based on the correction priority, the correction candidate semantic elements with a semantic element "Mark" 1440 in the second text.

The electronic device 2000 according to an embodiment of the disclosure may perform operations S1310 through S1340 of FIG. 13 to compare the correction candidate semantic elements in the first text and the semantic element in the second text.

According to an embodiment of the disclosure, the electronic device 2000 may obtain, as a result of comparing the semantic elements based on the correction priority, a difference value "4" between "Mike" 1420 that is one of the correction candidate semantic elements, and "Mark" 1440 that is the semantic element in the second text. Here, because the obtained difference value is smaller than a pre-set threshold value "5", the electronic device 2000 may determine that the correction candidate semantic element "Mike" 1420 is similar to the semantic element "Mark" 1440 in the second text, and determine the correction candidate semantic element "Mike" 1420 as a correction target semantic element.

The electronic device 2000 may correct the first text by replacing "Mike" 1420 determined as the correction target semantic element with the semantic element "Mark" 1440 in the second text.

FIG. 15 is a flowchart of a method, performed by the electronic device 2000, of correcting a misrecognized input speech signal, based on a user input, according to an embodiment of the disclosure.

In operation S1510, the electronic device 2000 according to an embodiment of the disclosure may receive a first speech signal from a user and obtain first text by converting the first speech signal. The electronic device 2000 may transcribe a speech of the user into text by performing ASR on the received first speech signal, thereby obtaining the first text converted from the first speech signal.

In operation S1520, the electronic device 2000 according to an embodiment of the disclosure may analyze the obtained first text by applying the obtained first text to the NLU model 2522. The electronic device 2000 may parse the first text and identify an intent indicating an utterance intention of the first speech signal and entities indicating components of a sentence of the first speech signal, by using the NLU model 2522. Also, the electronic device 2000 may obtain a confidence score of the identified intent.

In operation S1530, the electronic device 2000 according to an embodiment of the disclosure may identify a plurality of correction candidate semantic elements that may be correction targets in the first text, by inputting the first text obtained from the first speech signal, the intent of the first speech signal, and the confidence score of the intent to the WOI identification model 2535. Here, the WOI identification model 2535 may be an artificial intelligence model obtained via training.

Here, the plurality of correction candidate semantic elements identified by using the WOI identification model 2535 may be labeled based on a certain standard such that, when a correction utterance of the user is input to correct the first text, the correction candidate semantic elements in the first text are sequentially compared with the correction utterance of the user.

In operation S1540, the electronic device 2000 according to an embodiment of the disclosure may obtain second text by converting a second speech signal additionally input to the electronic device 2000. The electronic device 2000 may output a confirmation request for performing a task corresponding to the intent of the first speech signal by analyzing the first text obtained from the first speech signal.

According to an embodiment of the disclosure, when the confirmation request output from the electronic device 2000 is different from an intention of the user, the second speech signal for correcting a result of recognizing the first speech signal may be input to the electronic device 2000.

According to an embodiment of the disclosure, when the confirmation request output from the electronic device 2000 is the same from the intention of the user, the second speech signal for approving the result of recognizing the first speech signal may be input to the electronic device 2000.

In operation S1550, the electronic device 2000 according to an embodiment of the disclosure may identify whether the second speech signal is a speech signal for correcting the first text, by analyzing the obtained second text.

According to an embodiment of the disclosure, the electronic device 2000 may analyze the second text by using a rule-based analysis method, and identify whether the second speech signal is the speech signal for correcting the first text, based on whether the second text includes a word (e.g., "no") intending to correct the first text.

According to an embodiment of the disclosure, the electronic device 2000 may parse the second text by using the NLU model 2522, and identify an intent indicating an utterance intention of the second speech signal and entities indicating components of a sentence of the second speech signal. The electronic device 2000 may identify whether the second speech signal is the speech signal for correcting the first text, based on whether the identified intent of the second speech signal is an intent included in a "correction" domain.

In operation S1560, the electronic device 2000 according to an embodiment of the disclosure may compare the first text and the second text, based on a result of the identifying in operation S1550.

When the second speech signal is identified as the speech signal for correcting the first text, the electronic device 2000 may compare the plurality of correction candidate semantic elements in the first text with a semantic element in the second text, based on the confidence score of the intent of the first speech signal, so as to correct the first text.

Here, when comparing the plurality of correction candidate semantic elements in the first text with the semantic element in the second text, the electronic device 2000 may sequentially compare a plurality of semantic elements in the first text with the semantic element in the second text. Also, to determine an order of comparing the plurality of semantic elements in the first text with the semantic element in the second text, the electronic device 2000 may use labeling information of the correction candidate semantic elements obtained by using the WOI identification model 2535. For example, when the confidence score of the intent of the first speech signal is equal to or greater than a certain threshold value, the electronic device 2000 may compare first semantic elements labeled with a label number of 1 with the semantic element in the second text. Also, when the confidence score of the intent of the first speech signal is smaller than the certain threshold value, the electronic device 2000 may compare second semantic elements labeled with a label number of 2 with the semantic element in the second text.

In operation S1570, the electronic device 2000 according to an embodiment of the disclosure may correct at least one of the plurality of correction candidate semantic elements in the first text, based on a result of comparing the semantic elements. For example, the electronic device 2000 may correct the first text by comparing the plurality of correction candidate semantic elements in the first text with the semantic element in the second text for correction by the user and replacing at least one of the plurality of correction candidate semantic elements with the semantic element in the second text.

The block diagram of the electronic device 2000 of FIG. 2 is a block diagram according to an embodiment of the disclosure. Components of the block diagram may be integrated, a component may be added, or a component may be omitted according to the specification of each device that is actually implemented. In other words, two or more components may be integrated into one component or one component may be divided into two or more components when necessary. Also, a function performed by each block is only for describing embodiments of the disclosure and specific operations or apparatuses do not limit the scope of right of the disclosure.

An operating method of an electronic device, according to an embodiment of the disclosure, may be recorded on a non-transitory computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level language codes executable by a computer by using an interpreter.

Furthermore, an operating method of an electronic device, according to the embodiments of the disclosure may be provided by being included in a computer program product. The computer program products are products that can be traded between sellers and buyers.

The computer program product may include a software program or a computer-readable storage medium storing a software program. For example, the computer program product may include a product (e.g., a downloadable application) in a form of a software program that is electronically distributable through a manufacturer of the electronic device or an electronic market (e.g., Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of an electronic device. Alternatively, when there is a third device, e.g., a smartphone, that communicates with the electronic device, the computer program product may include a storage medium of the third device. Alternatively, the computer program product may include the software program transmitted from the electronic device, or transmitted from the third device to the electronic device.

In this case, one of the electronic device and the third device may perform a method according to embodiments of the disclosure by executing the computer program product. Alternatively, the electronic device and the third device may execute the computer program product to perform the method according to the embodiments of the disclosure in a distributed fashion.

For example, the electronic device may execute the computer program stored in the electronic device to control the third device communicably connected to the electronic device to perform the method according to the embodiments of the disclosure.

While the embodiments of the disclosure have been particularly shown and described in detail, it will be understood by one of ordinary skill in the art that various changes in form and details may be made therein without departing from the spirit and scope of the disclosure as defined by the following claims.

What is claimed is:

1. A method, performed by an electronic device, of correcting a speech input, the method comprising:
   receiving a first speech signal;
   obtaining first text by converting the first speech signal to text;
   obtaining an intent of the first speech signal and a confidence score of the intent, by inputting the first text to a natural language understanding model;
   identifying a plurality of correction candidate semantic elements capable of being correction targets in the first text, by inputting the first text, the intent, and the confidence score of the intent to an artificial intelligence model;
   comparing the confidence score of the intent with a first threshold value;
   determining a correction priority of the plurality of correction candidate semantic elements, based on a result of the comparing the confidence score with the first threshold value;
   receiving a second speech signal;
   obtaining second text by converting the second speech signal to text;
   identifying whether the second speech signal is a speech signal for correcting the first text, by analyzing the second text;
   based on identifying the second speech signal is the speech signal for correcting the first text, comparing the plurality of correction candidate semantic elements in the first text with a semantic element in the second text, based on the confidence score; and
   correcting at least one of the plurality of correction candidate semantic elements in the first text, based on a result of the comparing the plurality of correction candidate semantic elements in the first text with the semantic element in the second text,
   wherein the first threshold value is determined based on another confidence score of speech signal input to the electronic device before the first speech signal corresponding to the first text is received and
   wherein an intent of the speech signal input to the electronic device before the first speech signal is received is of a same domain as the intent of the first speech signal.

2. The method of claim 1, further comprising outputting a confirmation request for performing a task corresponding to the intent of the first speech signal,
   wherein the second speech signal is received after the confirmation request is output.

3. The method of claim 1, wherein the identifying whether the second speech signal is the speech signal for correcting the first text comprises identifying an intent of the second speech signal indicating an intention of to correct the first text, and the semantic element indicating a word to be corrected, by inputting the second text to the natural language understanding model.

4. The method of claim 1, wherein the identifying the plurality of correction candidate semantic elements comprises identifying a first correction candidate semantic element and a second correction candidate semantic element from the first text, and
   wherein the first correction candidate semantic element indicates a word related to the intent of the first speech signal and the second correction candidate semantic element indicates the intent of the first speech signal.

5. The method of claim 4, wherein the determining the correction priority of the plurality of correction candidate semantic elements comprises:
   based on the confidence score of the intent of the first speech signal being equal to or greater than the first threshold value, determining the first correction candidate semantic element to have a higher correction priority than the second correction candidate semantic element; and
   based on the confidence score of the intent of the first speech signal being less than the first threshold value, determining the second correction candidate semantic element to have a higher correction priority than the first correction candidate semantic element.

6. The method of claim 1, wherein the comparing the plurality of correction candidate semantic elements in the first text with the semantic element in the second text comprises calculating difference values indicating differences between the plurality of correction candidate semantic elements in the first text and the semantic element for correction in the second text, based on the correction priority.

7. The method of claim 6, wherein the correcting the at least one of the plurality of correction candidate semantic elements in the first text comprises correcting a semantic element from among the plurality of correction candidate semantic elements in the first text, based on results of comparing the difference values with a second threshold value.

8. The method of claim 6, wherein the calculating of the difference values comprises calculating the difference values by applying an edit distance algorithm, based on at least one of a difference between characters, a difference between words, or a difference between pronunciation expressions.

9. An electronic device for correcting a speech input, the electronic device comprising:
   an input interface configured to receive a speech signal;
   a storage storing a program including one or more instructions; and
   a processor configured to execute the one or more instructions of the program stored in the storage to:
      receive a first speech signal via the input interface;
      obtain first text by converting the first speech signal to text;
      obtain an intent of the first speech signal and a confidence score of the intent, by inputting the first text to a natural language understanding model;
      identify a plurality of correction candidate semantic elements capable of being correction targets in the first text, by inputting the first text, the intent, and the confidence score of the intent to an artificial intelligence model;
      comparing the confidence score of the intent with a first threshold value;

determining a correction priority of the plurality of correction candidate semantic elements, based on a result of the comparing the confidence score with the first threshold value;

receive a second speech signal via the input interface;

obtain second text by converting the second speech signal to text;

identify whether the second speech signal is a speech signal for correcting the first text, by analyzing the second text;

based on identifying the second speech signal is the speech signal for correcting the first text, compare the plurality of correction candidate semantic elements in the first text with a semantic element in the second text, based on the confidence score; and correct at least one of the plurality of correction candidate semantic elements in the first text, based on a result of comparing the plurality of correction candidate semantic elements in the first text with the semantic element in the second text, wherein the first threshold value is determined based on another confidence score of a speech signal input to the electronic device before the first speech signal corresponding to the first text is received, and wherein an intent of the speech sig nal: el ect onic device before the first speech signal is received is of a same domain as the intent of the first speech signal.

10. The electronic device of claim 9, further comprising an output interface, wherein the processor is further configured to execute the one or more instructions to output, via the output interface, a confirmation request for performing a task corresponding to the intent of the first speech signal, and wherein the second speech signal is received after the confirmation request is output.

11. The electronic device of claim 9, wherein the processor is further configured to execute the one or more instructions to identify an intent of the second speech signal indicating an intention to correct the first text, and the semantic element indicating a word to be corrected, by applying the second text to the natural language understanding model.

12. The electronic device of claim 9, wherein the processor is further configured to execute the one or more instructions to identify a first correction candidate semantic element and a second correction candidate semantic element from the first text, and wherein the first correction candidate semantic element indicates a word related to the intent of the first speech signal and the second correction candidate semantic element indicates the intent of the first speech signal.

13. The electronic device of claim 12, wherein the processor is further configured to execute the one or more instructions to:

based on the confidence score of the intent of the first speech signal being equal to or greater than the first threshold value, determine the first correction candidate semantic element to have a higher correction priority than the second correction candidate semantic element; and based on the confidence score of the intent of the first speech signal being less than the first threshold value, determine the second correction candidate semantic element to have a higher correction priority than the first correction candidate semantic element.

14. The electronic device of claim 9, wherein the processor is further configured to execute the one or more instructions to calculate difference values indicating differences between the plurality of correction candidate semantic elements in the first text and the semantic element for correction in the second text, based on the correction priority.

15. The electronic device of claim 14, wherein the processor is further configured to execute the one or more instructions to correct a semantic element from among the plurality of correction candidate semantic elements in the first text, based on results of comparing the difference values with a second threshold value.

16. A non-transitory computer-readable recording medium having recorded thereon a program for executing, by an electronic device, a method comprising:

receiving a first speech signal;

obtaining first text by converting the first speech signal to text;

obtaining an intent of the first speech signal and a confidence score of the intent, by inputting the first text to a natural language understanding model;

identifying a plurality of correction candidate semantic elements capable of being correction targets in the first text, by inputting the first text, the intent, and the confidence score of the intent to an artificial intelligence model;

comparing the confidence score of the intent with a first threshold value;

determining a correction priority of the plurality of correction candidate semantic elements, based on a result of the comparing the confidence score with the first threshold value;

receiving a second speech signal;

obtaining second text by converting the second speech signal to text;

identifying whether the second speech signal is a speech signal for correcting the first text, by analyzing the second text;

based identifying on the second speech signal being the speech signal for correcting the first text, comparing the plurality of correction candidate semantic elements in the first text with a semantic element in the second text, based on the confidence score; and correcting at least one of the plurality of correction candidate semantic elements in the first text, based on a result of the comparing the plurality of correction candidate semantic elements in the first text with the semantic element in the second text, wherein the first threshold value is determined based on another confidence score of a speech signal input to the electronic device before the first speech signal corresponding to the first text is received, and wherein an intent of the speech input to the electronic before the first speech signal is received is of a same domain as the intent of the first speech signal.

* * * * *